United States Patent
Elshafie et al.

(10) Patent No.: US 11,349,697 B2
(45) Date of Patent: May 31, 2022

(54) USER EQUIPMENT (UE) TRANSMITTER AND BASE STATION RECEIVER FOR TRANSMISSIONS FROM A UE TO A BASE STATION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/326,099

(22) Filed: May 20, 2021

(65) Prior Publication Data
US 2021/0367826 A1    Nov. 25, 2021

Related U.S. Application Data

(60) Provisional application No. 63/028,359, filed on May 21, 2020.

(51) Int. Cl.
H04L 27/26    (2006.01)

(52) U.S. Cl.
CPC .............................. *H04L 27/26524* (2021.01)

(58) Field of Classification Search
CPC ......... H04L 5/0026; H04L 2025/03414; H04L 5/0007; H04L 27/26524; H04W 72/042; H04W 76/27; H04W 72/0413; H04B 7/0456
See application file for complete search history.

(56) References Cited

U.S. PATENT DOCUMENTS

2020/0267701 A1*   8/2020   Park .................... H04L 5/0057

* cited by examiner

*Primary Examiner* — Rahel Guarino
(74) *Attorney, Agent, or Firm* — Norton Rose Fulbright US LLP

(57) ABSTRACT

An apparatus for wireless communication includes a receiver configured to receive control information associated with a non-coherent transmission to a base station. The apparatus further includes a transmitter configured to perform the non-coherent transmission based on the control information. The non-coherent transmission includes transmission of a codepoint to the base station, and the codepoint is determined based a diagonalized base sequence parameter matrix, a first discrete Fourier transform (DFT) matrix of a first size, and a second DFT matrix of a second size.

30 Claims, 10 Drawing Sheets

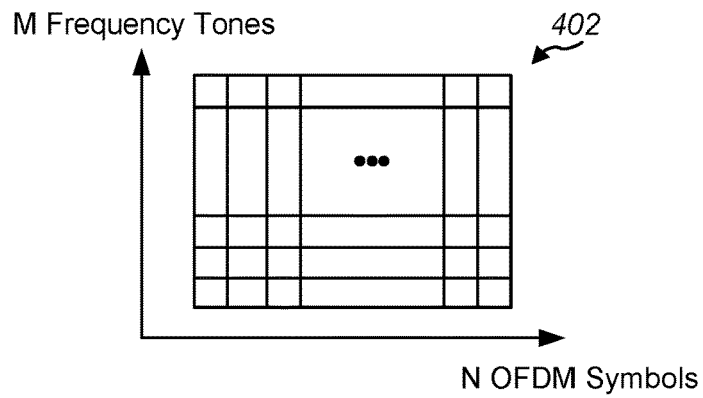
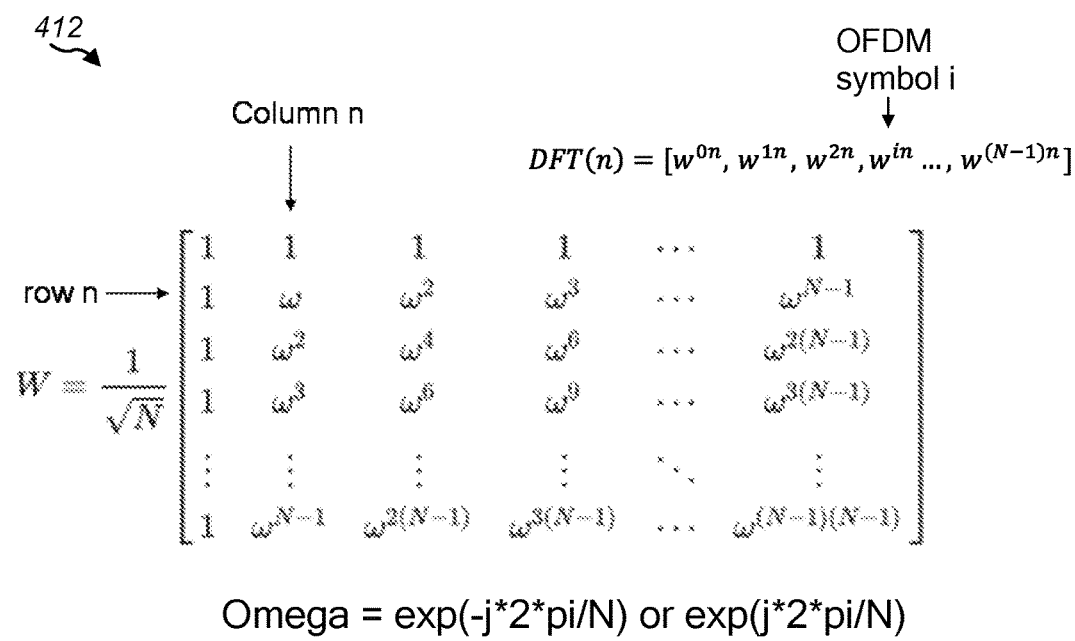
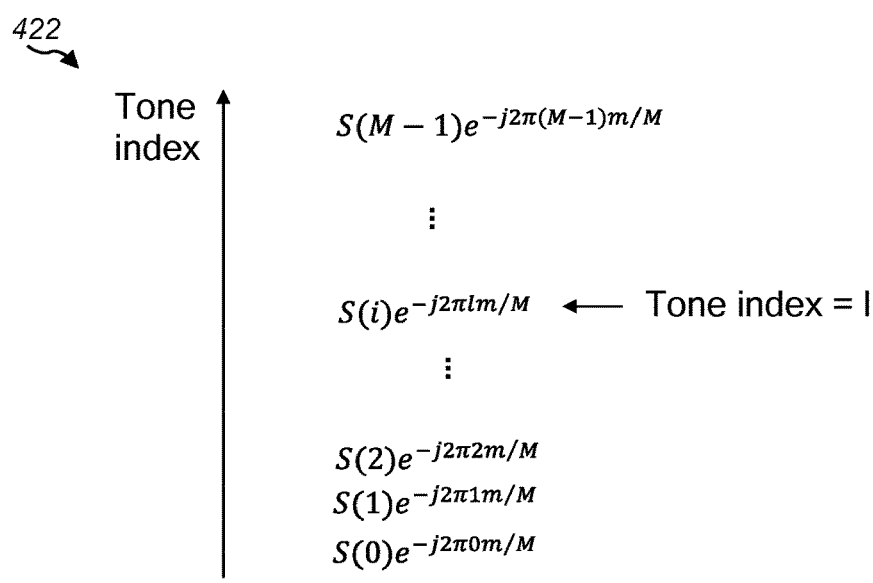
FIG. 4

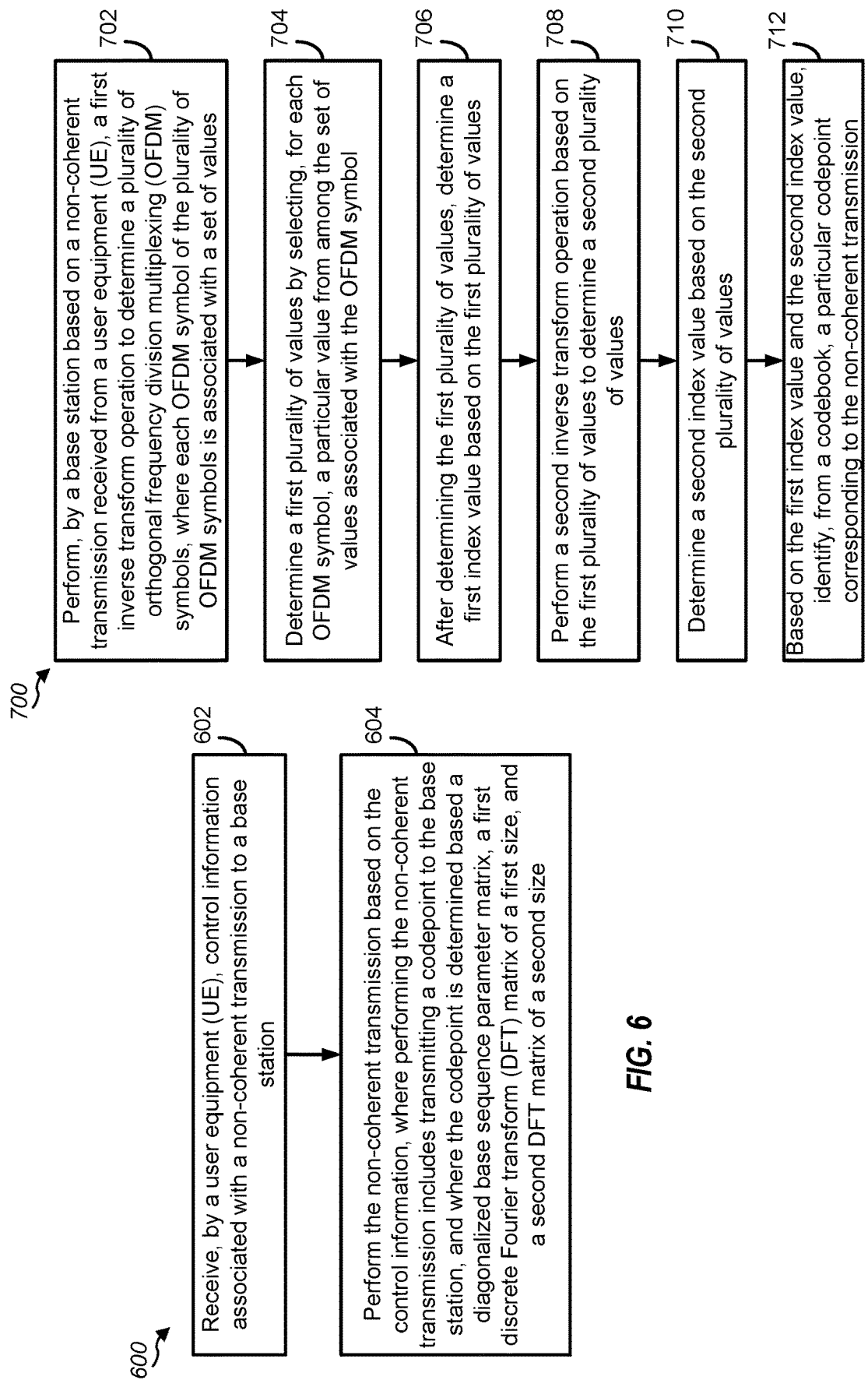

USER EQUIPMENT (UE) TRANSMITTER AND BASE STATION RECEIVER FOR TRANSMISSIONS FROM A UE TO A BASE STATION

CROSS-REFERENCE TO RELATED APPLICATIONS

This application claims the benefit of and priority to U.S. Prov. Pat. App. No. 63/028,359, entitled, "BASE STATION RECEIVER FOR TRANSMISSIONS FROM A USER EQUIPMENT," filed on May 21, 2020, which is expressly incorporated by reference herein in its entirety.

TECHNICAL FIELD

Aspects of the present disclosure relate generally to wireless communication systems, and more particularly, to transmitters and receivers for wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a receiver configured to receive control information associated with a non-coherent transmission to a base station. The apparatus further includes a transmitter configured to perform the non-coherent transmission based on the control information. The non-coherent transmission includes transmission of a codepoint to the base station, and the codepoint is determined based a diagonalized base sequence parameter matrix, a first discrete Fourier transform (DFT) matrix of a first size, and a second DFT matrix of a second size.

In some other aspects of the disclosure, a method of wireless communication includes receiving, by a user equipment (UE), control information associated with a non-coherent transmission to a base station. The method further includes performing the non-coherent transmission based on the control information. Performing the non-coherent transmission includes transmitting a codepoint to the base station, and the codepoint is determined based a diagonalized base sequence parameter matrix, a first DFT matrix of a first size, and a second DFT matrix of a second size.

In some other aspects of the disclosure, a method of wireless communication includes performing, by a base station based on a non-coherent transmission received from a UE, a first inverse transform associated with a plurality of orthogonal frequency division multiplexing (OFDM) symbols of the non-coherent transmission to generate a first plurality of values. The method further includes determining a first index value based on a plurality of sums associated with rows of the first plurality of values. The method further includes performing a second inverse transform based on a particular row of the first plurality of values to generate a second plurality of values and determining a second index value based on the second plurality of values. The method further includes, based on the first index value and the second index value, identifying, from a codebook, a particular codepoint corresponding to the non-coherent transmission.

In some other aspects of the disclosure, an apparatus includes a memory and one or more processors coupled to the memory. The one or more processors are configured to perform, based on a non-coherent transmission received from a UE, a first inverse transform associated with a plurality of OFDM symbols of the non-coherent transmission to generate a first plurality of values. The one or more processors are further configured to determine a first index value based on a plurality of sums associated with rows of the first plurality of values and to perform a second inverse transform based on a particular row of the first plurality of values to generate a second plurality of values. The one or more processors are further configured to determine a second index value based on the second plurality of values and to identify, from a codebook based on the first index value and the second index value, a particular codepoint corresponding to the non-coherent transmission.

In some other aspects of the disclosure, an apparatus includes means for performing, based on a non-coherent transmission received from a UE, a first inverse transform associated with a plurality of OFDM symbols of the non-coherent transmission to generate a first plurality of values. The apparatus further includes means for determining a first index value based on a plurality of sums associated with rows of the first plurality of values. The apparatus further includes means for performing a second inverse transform based on a particular row of the first plurality of values to generate a second plurality of values and means for determining a second index value based on the second plurality of values. The apparatus further includes means for identifying, from a codebook based on the first index value and the second index value, a particular codepoint corresponding to the non-coherent transmission.

In some other aspects of the disclosure, a non-transitory computer-readable medium stores instructions executable by a processor to perform operations. The operations include performing, based on a non-coherent transmission received from a UE, a first inverse transform associated with a plurality of OFDM symbols of the non-coherent transmission to generate a first plurality of values. The operations further include determining a first index value based on a plurality of sums associated with rows of the first plurality of values and performing a second inverse transform based on a particular row of the first plurality of values to generate a second plurality of values. The operations further include determining a second index value based on the second plurality of values and identifying, from a codebook based on the first index value and the second index value, a particular codepoint corresponding to the non-coherent transmission.

In some other aspects of the disclosure, a method of wireless communication includes performing, by a base station based on a non-coherent transmission received from a UE, a first inverse transform associated with a plurality of OFDM symbols of the non-coherent transmission to generate a first plurality of values. The method further includes determining a plurality of sums associated with rows of the first plurality of values. The method further includes, based on a particular number of values selected from the plurality of sums, selecting multiple rows from the first plurality of values to determine a subset of values of the first plurality of values. The method further includes performing a second inverse transform based on the subset of values to generate a second plurality of values and identifying, from a codebook based on index values associated with a value of the second plurality of values having a greater magnitude than others of the second plurality of values, a particular codepoint corresponding to the non-coherent transmission.

In some other aspects of the disclosure, an apparatus includes a memory and one or more processors coupled to the memory. The one or more processors are configured to perform, based on a non-coherent transmission received from a UE, a first inverse transform associated with a plurality of OFDM symbols of the non-coherent transmission to generate a first plurality of values. The one or more processors are further configured to determine a plurality of sums associated with rows of the first plurality of values and to select, based on a particular number of values selected from the plurality of sums, multiple rows from the first plurality of values to determine a subset of values of the first plurality of values. The one or more processors are further configured to perform a second inverse transform based on the subset of values to generate a second plurality of values and to identify, from a codebook based on index values associated with a value of the second plurality of values having a greater magnitude than others of the second plurality of values, a particular codepoint corresponding to the non-coherent transmission.

In some other aspects of the disclosure, an apparatus includes means for performing, based on a non-coherent transmission received from a UE, a first inverse transform associated with a plurality of OFDM symbols of the non-coherent transmission to generate a first plurality of values. The apparatus further includes means for determining a plurality of sums associated with rows of the first plurality of values and means for selecting, based on a particular number of values selected from the plurality of sums, multiple rows from the first plurality of values to determine a subset of values of the first plurality of values. The apparatus further includes means for performing a second inverse transform based on the subset of values to generate a second plurality of values and means for identifying, from a codebook based on index values associated with a value of the second plurality of values having a greater magnitude than others of the second plurality of values, a particular codepoint corresponding to the non-coherent transmission.

In some other aspects of the disclosure, a non-transitory computer-readable medium stores instructions executable by a processor to perform operations. The operations include performing, based on a non-coherent transmission received from a UE, a first inverse transform associated with a plurality of OFDM symbols of the non-coherent transmission to generate a first plurality of values. The operations further include determining a plurality of sums associated with rows of the first plurality of values and, based on a particular number of values selected from the plurality of sums, selecting multiple rows from the first plurality of values to determine a subset of values of the first plurality of values. The operations further include performing a second inverse transform based on the subset of values to generate a second plurality of values and, based on index values associated with a value of the second plurality of values having a greater magnitude than others of the second plurality of values, identifying, from a codebook, a particular codepoint corresponding to the non-coherent transmission.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a diagram illustrating certain examples associated with a codebook that may be used in connection with two-dimensional operations for a non-coherent transmission according to some aspects of the disclosure.

FIG. 6 is a flow chart of an example of a method of wireless communication that may be performed by a UE according to some aspects of the disclosure.

FIG. 7A is a flow chart of an example of a method of wireless communication that may be performed by a base station according to some aspects of the disclosure.

DETAILED DESCRIPTION

Figure 1:
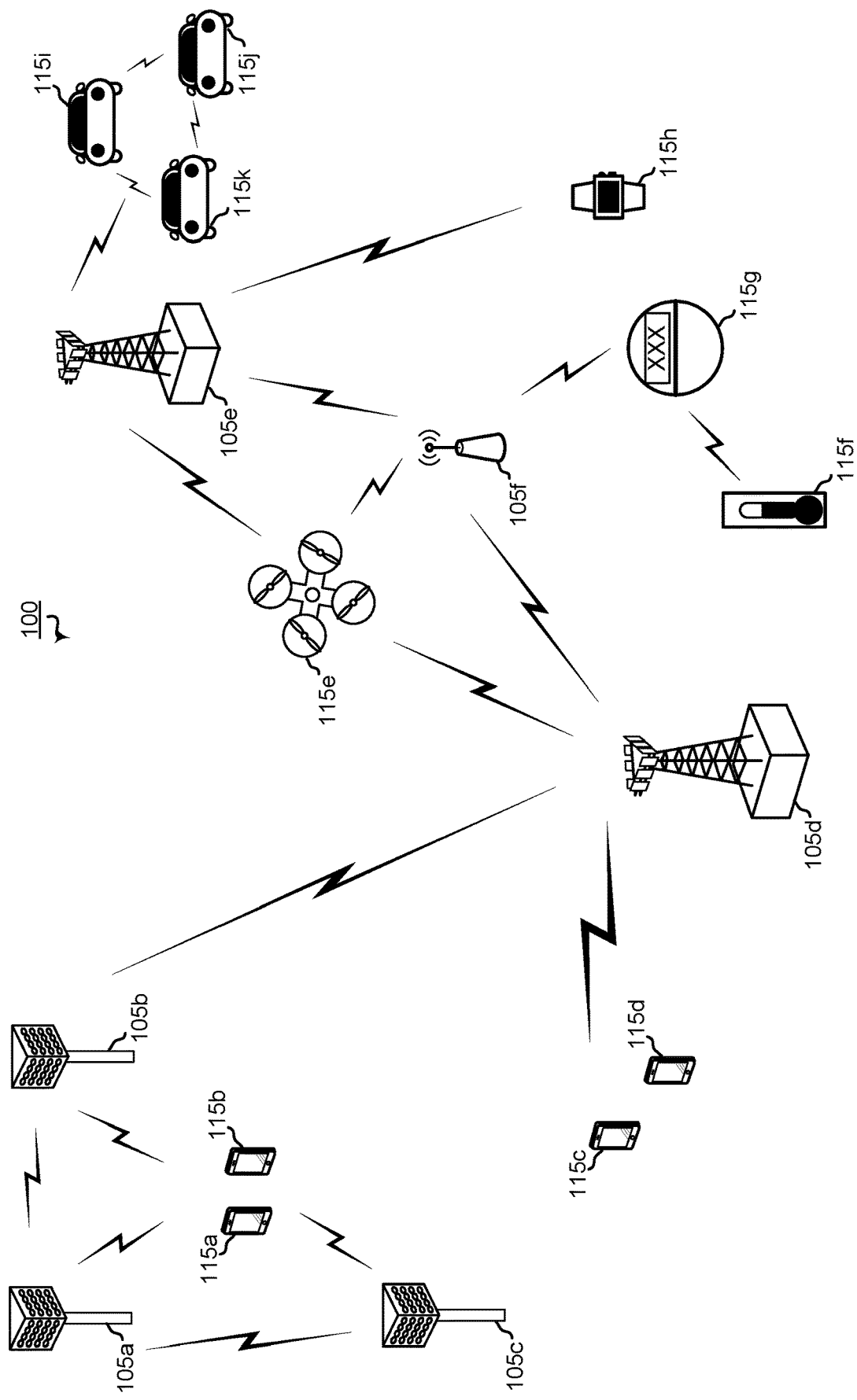
FIG. 1 is a block diagram illustrating an example of a wireless communication system to perform two-dimensional operations for a non-coherent transmission according to some aspects of the disclosure.

Wireless signals sent within a wireless communication system may be subject to noise, interference, and other conditions that reduce signal quality. To compensate for effects of noise, interference, and other conditions, some wireless communication systems use reference signals to estimate and then reduce or cancel the effects. For example, a user equipment (UE) may send a demodulation reference signal (DMRS) to a base station, and the base station may use the DMRS to estimate and compensate for effects of noise, interference, and other conditions on other signals sent by the UE to the base station. Transmission of signals using the DMRS may be referred to as a coherent transmission technique.

In some cases, DMRS-based communications may be less efficient than another technique, such as a non-coherent transmission technique. For example, in some circumstances, use of a DMRS may provide a poor estimate of the effects of noise, interference, and other conditions, such as in cases where a signal-to-noise ratio (SNR) is relatively low. In this case, a non-coherent transmission technique may be used. In an example of a non-coherent transmission, a UE may avoid sending a DMRS to a base station, and the base station may receive signals from the UE using a DMRS. Upon receiving the non-coherent transmission, the base station may use a correlator to decode the non-coherent transmission. The correlation operation consumes power and processing cycles of the base station, which may reduce battery life and increase communication latency.

A wireless communication system in accordance with some aspects of the disclosure may use multi-dimensional operations to transmit a non-coherent transmission, to receive a non-coherent transmission, or both. The multi-dimensional operations may reduce complexity associated with the non-coherent transmission, which may reduce power consumption, latency, or both. The multi-dimensional operations may be of a lower complexity than other operations, such as correlation-based operations. To illustrate, a UE may perform certain two-dimensional multiplication operations to generate a codepoint representing control information. The UE may send the codepoint to a base station using a non-coherent transmission, and the base station may use a multi-dimensional receiver to decode the codepoint using multi-dimensional transform operations. The multiple dimensions may include a number of tones (M) associated with the non-coherent transmission and a number of OFDM symbols (N) associated with the non-coherent transmission.

A particular stage of the multi-dimensional receiver may have a complexity of $N*(M*\log 2(M)+\log 2(N))$ operations or $N*(M*\log 2(M)+L*\log 2(N))$ operations (where log 2 indicates a base-two logarithm, where M indicates a number of tones associated with a non-coherent transmission, where N indicates a number of OFDM symbols associated with the non-coherent transmission, and where L indicates a sub-matrix size). In some examples, the multi-dimensional receiver reduces a number of operations of the particular stage by $(M-1)*N*\log 2(N)$ operations or by $(M-L)*N*\log 2(N)$ operations as compared to certain other receiver designs, such as a correlator-based receiver. As a result, power consumption, processing cycles, and communication latency may be reduced.

To further illustrate, aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some implementations. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile device is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" device or UE need not necessarily have a capability to move, and may be stationary. Some non-limiting examples of a mobile device include a mobile phone, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile device may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the example illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile device, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
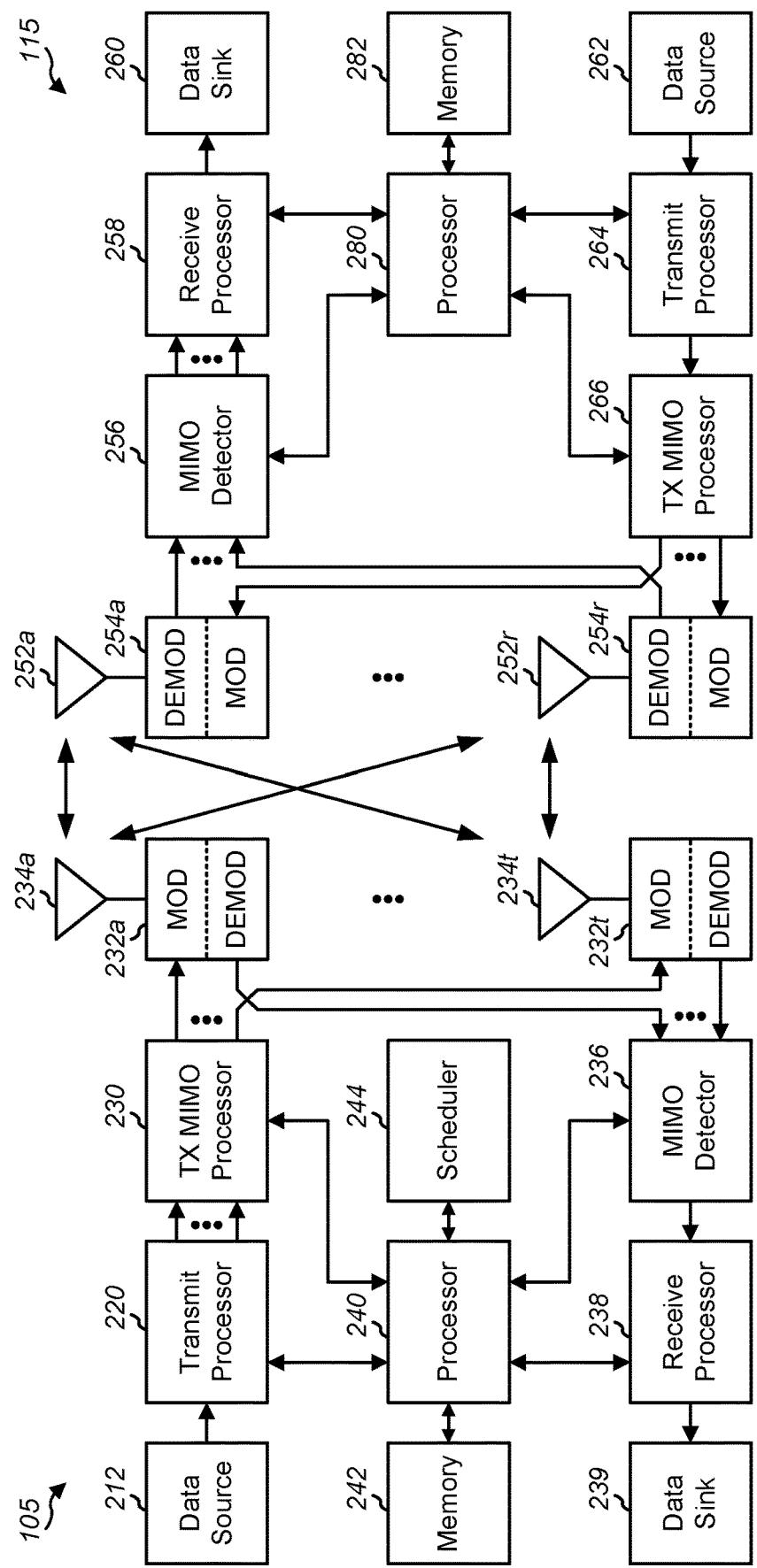
FIG. 2 is a block diagram illustrating examples of a base station and a UE to perform two-dimensional operations for a non-coherent transmission according to some aspects of the disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for the physical uplink shared channel (PUSCH)) from data source 262 and control information (e.g., for the physical uplink control channel (PUCCH)) from processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 and/or other processors and modules at base station 105 and/or processor 280 and/or other processors and modules at UE 115 may perform or direct the execution of various processes for the techniques described herein, such as to perform or direct the operations illustrated in FIGS. 6 and 7A-7C, one or more other operations, or a combination thereof. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3A:
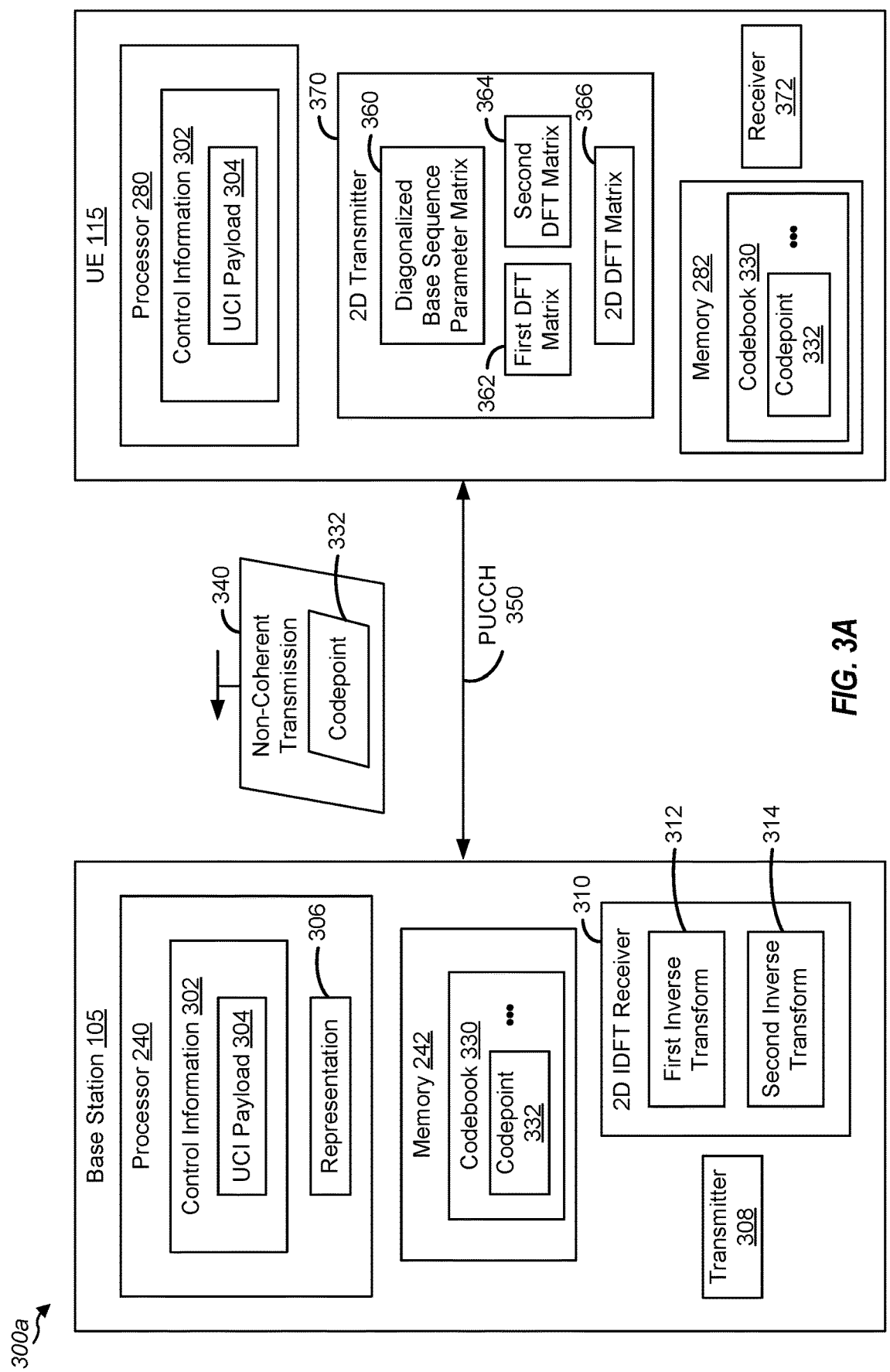
FIG. 3A is a block diagram illustrating another example of a wireless communication system to perform two-dimensional operations for a non-coherent transmission according to some aspects of the disclosure.

FIG. 3A illustrates another example of a wireless communication system 300a to determining a codepoint for a non-coherent transmission using a frequency domain technique. The wireless communication system 300a includes one or more base stations (such as the base station 105) and further includes one or more UEs, such as the UE 115.

During operation, the UE 115 is configured to perform a non-coherent transmission 340 to indicate control information 302 to the base station 105. As used herein, a non-coherent transmission may be performed without use of a demodulation reference signal (DMRS). The UE 115 may be configured to perform the non-coherent transmission 340 via a physical uplink control channel (PUCCH) 350. In some examples, the control information 302 includes or corresponds to an uplink control information (UCI) payload 304.

In some implementations, the UE 115 is configured to encode the control information 302 using a codebook 330 that is associated with non-coherent transmissions. The codebook 330 may include multiple codepoints, such as a codepoint 332. The codepoints of the codebook 330 may be orthogonal, such as where the codepoint 332 is orthogonal to each other codepoint of the codebook 330. The UE 115 may select one or more codepoints from the codebook 330 based on bits of the control information 302 and may transmit the one or more codepoints to the base station 105. To further illustrate, the UE 115 may select the codepoint 332 from the codebook 330 based on bits of the control information 302 and may transmit the codepoint 332 to the base station 105 via the PUCCH 350.

The base station 105 may receive a representation of the codepoint 332 that may differ from the codepoint 332 due to noise, interference, or other conditions. The base station 105 may use the codebook 330 to decode the representation of the codepoint 332 to generate the control information 302. The base station 105 may use the control information 302 to perform one or more operations, such as to schedule communications with the UE 115, to decode data sent by the UE 115 to the base station 105, to perform one or more other operations, or a combination thereof.

To further illustrate, FIG. 4 is a diagram illustrating certain examples associated with the codebook 330. FIG. 4 depicts a resource grid 402 associated with the PUCCH. The resource grid includes M frequency tones and N OFDM symbols, where M and N are positive numbers. FIG. 4 also illustrates an example of a discrete Fourier transform (DFT) matrix 412 having N rows and N columns (also referred to herein as a DFT matrix of size N). In some examples, a DFT(n) corresponds to an (n)th row or column of the DFT matrix 412, where an (i)th value of the DFT(n) corresponds to an i(th) OFDM symbol of the N OFDM symbols of the resource grid 402 (where $0 \leq i \leq N-1$, and where $1 \leq n \leq N$). In some examples, i may be referred to as an OFDM symbol index of the N OFDM symbols of the resource grid 402.

FIG. 4 also illustrates M values 422 associated with a base sequence parameter S. Each value 422 is based on a value of the base sequence parameter S (e.g., S(0), S(1), S(2), ... S(i), S(M−1). A time domain cyclic shift (CS) m may be applied to each value of the base sequence parameter S, where each time domain CS m corresponds to a phase ramp having a slope $-j2\pi lm/M$ or $j2\pi lm/M$ (where j=sqrt (−1), where $0 \leq l \leq M-1$, and where $1 \leq m \leq M$). In some examples, l may be referred to as a tone index of the M frequency tones, of the resource grid 402.

Figure 5:
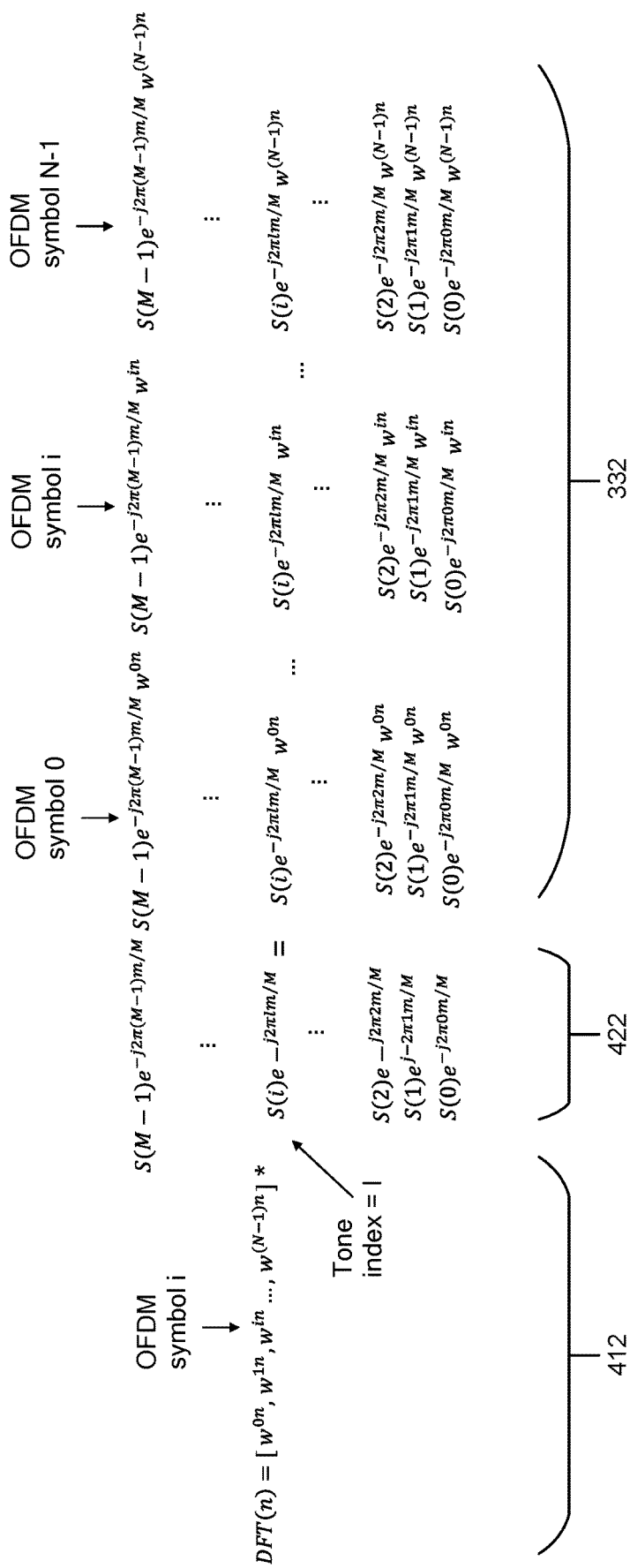
FIG. 5 is a diagram illustrating an example of generating a codepoint that may be used in connection with two-dimensional operations for a non-coherent transmission according to some aspects of the disclosure.

FIG. 5 is a diagram illustrating an example of generating a codepoint of the codebook 330, such as the codepoint 332. The codepoint 332 may be generated based on the DFT matrix 412 and the values 422 of the base sequence parameter S. For example, codepoint 332 may be generated based on a Kronecker product of the DFT matrix 412 and the values 422.

Referring again to FIG. 3A, in some aspects of the disclosure, the UE 115 may be configured to determine the codepoint 332 using a diagonalized base sequence parameter matrix 360 (e.g., diagonalized values of the base sequence parameter S), a first discrete Fourier transform (DFT) matrix 362 of a first size, and a second DFT matrix 364 of a second size. To further illustrate, Equations 1, 2, and 3 illustrate certain examples of the diagonalized base sequence parameter matrix 360, the first DFT matrix 362, and the second DFT matrix 364, respectively:

$$S = \text{diag}([S(0), S(1), \ldots, S(M-1)]) \quad \text{(Equation 1)}$$

$$\text{DFT}_M(m) = [w_M^{0m}, w_M^{1m}, w_M^{2m}, \ldots, w_M^{im}, \ldots, w_M^{(M-1)m}] \quad \text{(Equation 2)}$$

$$\text{DFT}_N(n) = [w_N^{0m}, w_N^{1m}, w_N^{2m}, \ldots, w_N^{im}, \ldots, w_N^{(N-1)m}] \quad \text{(Equation 3)}.$$

In some examples, $w_N = \exp(-j2\pi/N)$, and $w_M = \exp(-j2\pi/M)$. In the example of Equation 2, the first DFT matrix 362 has a first size of M and is indicated as DFTM(m). The first size of the first DFT matrix 362 may correspond to a number of frequency tones (e.g., M) associated with the codepoint 332. In the example of Equation 3, the second DFT matrix 364 has a second size of N and is indicated as DFTN(n). The second size of the second DFT matrix 364 may correspond to a number of OFDM symbols (e.g., N) associated with the codepoint 332.

The codepoint 332 may be based on a Kronecker product of the first DFT matrix 362 and the second DFT matrix 364. For example, the UE 115 may determine the Kronecker product of the DFT matrices 362, 364 and may multiply the diagonalized base sequence parameter matrix 360 with the Kronecker product of the DFT matrices 362, 364 to determine the codepoint 332. In this example, the codepoint 332 corresponds to a product of the diagonalized base sequence parameter matrix 360 and the Kronecker product of the first DFT matrix 362 and the second DFT matrix 364. In some examples, the UE determines the Kronecker product of the DFT matrices 362, 364 in accordance with Equation 4:

$$kron(DFT_N, \quad \text{(Equation 4)}$$

$$DFT_M) = \begin{bmatrix} W_N^{01} DFT_M & \cdots & W_N^{0(N-1)} DFT_M \\ \vdots & \ddots & \vdots \\ W_N^{(N-1)1} DFT_M & \cdots & W_N^{(N-1)(N-1)} DFT_M \end{bmatrix}.$$

An (n)th row of the Kronecker product of the DFT matrices 362, 364 may correspond to:

$$[w_N^{0n} DFT_M, w_N^{0n} DFT_M, w_N^{1n} DFT_M \ldots w_N^{(N-1)n} DFT_M].$$

In some examples, the UE 115 stores a two-dimensional (2D) DFT matrix 366 that is based on the first DFT matrix 362 and the second DFT matrix 364. For example, the 2D DFT matrix 366 may correspond to a Kronecker product of the first DFT matrix 362 and the second DFT matrix 364. In some examples, the 2D DFT matrix 366 has a number of rows corresponding to a product of the first size of the first DFT matrix 362 and the second size of the second DFT matrix 364, a number of columns corresponding to a product of the first size of the first DFT matrix 362 and the second size of the second DFT matrix 364, or both. The number of rows of the 2D DFT matrix 366 may correspond to N*M, and the number of columns of the 2D DFT matrix 366 may correspond to N*M.

In some examples, the UE 115 may determine the codepoint 332 based on the 2D DFT matrix 366. In one example, the UE 115 may select a subset of the 2D DFT matrix 366 and may multiply the diagonalized base sequence parameter matrix 360 with the subset to determine the codepoint 332. In one example, the subset may correspond to a particular row of the 2D DFT matrix 366, and the UE 115 may select the subset (e.g., row) of the 2D DFT matrix 366 based on a number of frequency tones (e.g., m) associated with the codepoint 332.

In some implementations, to select an (nm)th sequence of the 2D DFT matrix 366, for a particular n row, the UE 115 may select the (m)th column of each of N columns each having a size of M×1. By selecting the (m)th column of each of the N columns, the UE 115 may generate an M×N matrix. The UE 115 may multiply the M×N matrix with the diagonalized base sequence parameter matrix 360 to determine the codepoint 332.

In some implementations, the UE 115 includes a two-dimensional (2D) transmitter 370 and a receiver 372. The 2D transmitter 370 and the receiver 372 may perform one or more operations described herein. For example, the 2D transmitter 370 may determine the codepoint 332 using the 2D DFT matrix 366. In some examples, the 2D transmitter 370 and the receiver 372 include one or more components described with reference to FIG. 2, such as one or more of the modulator/demodulators 254a-r, the MIMO detector 256, the receive processor 258, the transmit processor 264, or the TX MIMO processor 266. The 2D transmitter 370 and the receiver 372 may be coupled to the antennas 252a-r of FIG. 2.

The UE 115 may be configured to transmit the codepoint 332 to the base station 105.

In some examples, the UE 115 transmits the codepoint 332 to the base station 105 by performing the non-coherent transmission 340 via the PUCCH 350. In some examples, the UE 115 performs the non-coherent transmission 340 without sending a demodulation reference signal (DMRS) to the base station 105.

The base station 105 may be configured to receive the non-coherent transmission 340 including a representation 306 of the codepoint 332 from the UE 115. In some circumstances, the representation 306 of the codepoint 332 may differ from the codepoint 332 due to noise, interference, or one or more other conditions.

The base station 105 may perform one or more operations to decode the representation 306 of the codepoint 332 (e.g., by correcting one or more errors of the representation 306 so that the corrected representation 306 matches the codepoint 332). In some examples, the base station 105 includes transmitter 308 and a 2D inverse discrete Fourier transform (IDFT) receiver 310. The 2D IDFT receiver 310 may be configured to perform a first inverse transform 312 and a second inverse transform 314 to decode the representation 306 of the codepoint 332. In some examples, the transmitter 308 and the 2D IDFT receiver 310 include one or more components described with reference to FIG. 2, such as one or more of the modulator/demodulators 232a-t, the MIMO detector 236, the receive processor 238, the transmit processor 220, or the TX MIMO processor 230. The transmitter 308 and the 2D IDFT receiver 310 may be coupled to the antennas 234a-t of FIG. 2.

In one example, the 2D IDFT receiver 310 performs a 2D IDFT operation on a received matrix Y that is indicated by the representation 306 of the codepoint 332. The 2D IDFT operation may include the first inverse transform 312 and the second inverse transform 314. The received matrix Y may include M rows and N columns (also referred to herein as a size of M×N). If no noise effects are present, Equation 5 illustrates an example of the received matrix Y:

$$Y = S\,kron(DFT_N(n), DFT_M(m)^T) \quad \text{(Equation 5).}$$

The base station 105 may decode the received matrix Y using the first inverse transform 312 and the second inverse transform 314 to generate a matrix O having a size M×N. The matrix O may correspond to O=IDFT_M Y IDFT_N, where IDFT_M may represent an M-point IDFT matrix corresponding to the first inverse transform 312, and where IDFT_N may represent an N-point IDFT matrix corresponding to the second inverse transform 314. If no noise effects are present in the received matrix Y, then the matrix O may include all zero values except a non-zero value at row m and column n (also referred to herein as index m,n) representing the sent codepoint 332. In other cases, noise or other effects may alter values of the matrix O. In this case, the base station 105 may identify the value of the matrix O having the greatest magnitude among values of the matrix O and may select row and column indices of the identified value as (m,n).

To illustrate, the base station 105 may implement the 2D IDFT receiver 310 by using the first inverse transform 312 to determine a plurality of OFDM symbols and the second inverse transform 314 to determine a plurality of tones. The plurality of OFDM symbols may correspond to OFDM symbols 0, . . . i, . . . N−1. The plurality of OFDM symbols may include a first number (e.g., N) of OFDM symbols. Each OFDM symbol of the plurality of OFDM symbols may be associated with a plurality of tones. The plurality of tones may include a second number (e.g., M) of tones. The first inverse transform 312 may have a first size (e.g., M) corresponding to a number of frequency tones associated with the codepoint 332. For example, the first inverse transform 312 may be an M-point inverse transform. In some examples, prior to performing the first inverse transform 312, the base station 105 multiplies the representation 306 by a base sequence parameter matrix (e.g., the diagonalized base sequence parameter matrix 360 or another base sequence parameter matrix) to determine the plurality of OFDM symbols.

To further reduce receiver complexity, in some aspects of the disclosure, the base station 105 may implement the 2D IDFT receiver 310 using a low-complexity second inverse transform 314 to determine the plurality of tones by performing a decision based the first plurality of values (e.g., the values of m) after performing the first inverse transform 312. Accordingly, complexity associated with the second inverse transform 314 may be reduced from being based on operations using M vectors of size N (e.g., as described above) to being based on one vector of size N. To illustrate, in a non-limiting example, N=3, and M=4. In this example, the plurality of OFDM symbols includes three OFDM symbols (e.g., M0, M1, M2), and each OFDM symbol may include four frequency tones. The first inverse transform 312 may result in a set of values for each OFDM symbol, such as four different values for OFDM symbol $0 \leq i \leq N-1$ with magnitudes (e.g., Vi0, Vi1, Vi2, Vi3). As an additional illustration, in one example, after performing the first inverse transform 312, the set of values is [1.1, 0.6, 0.7, 0.8] for OFDM symbol 0, [0, 0.6, 0.1, 0.2] for OFDM symbol 1, and [0.2, 0.6, 0.7, 0.8] for OFDM symbol 2.

The 2D IDFT receiver 310 may determine a first plurality of values by selecting, for each OFDM symbol, a particular value from among the set of values associated with the OFDM symbol after performing the first inverse transform 312. To illustrate, the first OFDM symbol M0 may be associated with an index value m1, the second OFDM symbol M1 may be associated with an index value m2, and the third OFDM symbol M2 may be associated with an index value m3. In some implementations, the 2D IDFT receiver 310 determines the first plurality of values by selecting, for each OFDM symbol, the value having a greater magnitude than the other values associated with the OFDM symbol. To illustrate, the 2D IDFT receiver 310 may select V00 from M0, and thus m1=0 (because V00 is associated with an index value of zero). As additional examples, the 2D IDFT receiver 310 may select V11 from M1 and may select V23 from M2. In this case, m2=1 and m3=3. In this example, the first plurality of values includes 1.1, 0.6, and 0.8. In this example, the "best" m associated with each OFDM symbol may be 0, 1, and 3 for OFDM symbol 0, OFDM symbol 1, and OFDM symbol 2, respectively.

In a first example, after determining the first plurality of values, the 2D IDFT receiver 310 may determine a first index value (e.g., m) based on the first plurality of values. In some examples, the 2D IDFT receiver 310 selects the value Vij ($0 \leq i \leq N-1$ and $0 \leq j \leq M-1$) based on a magnitude associated with the first index value being greater than magnitudes associated with the other values of the first plurality of values. In this example, the first index value may correspond to 1.1 (because 1.1 is greater than 0.6 and 0.8) and the "best" m is 0. The first example may be referred to as a "maximum" value selection technique.

In a second example, after determining the first plurality of values, the 2D IDFT receiver 310 may select the first index value based on an average value of the first plurality of values. To illustrate, the first plurality of values may include 1.1, 0.6, and 0.8. The 2D IDFT receiver 310 may determine the average value according to round((0*1.1+1*0.6+3*0.8)/sumV)=0, where sumV=1.1+0.6+0.8. In some examples, the 2D IDFT receiver 310 may select, as the first index value, the value of the first plurality of values that is nearest to the average value. The second example may be referred to as an average-based technique.

In both the first example and the second example, the 2D IDFT receiver 310 may determine a single first index value m. To illustrate, in the first and second examples, the first index value m may correspond to 0.

The 2D IDFT receiver 310 may perform the second inverse transform 314 based on the first plurality of values to determine a second plurality of values and may determine a second index value (e.g., n) based on the second plurality of values. For example, the second inverse transform 314 may be an N-point inverse transform. In some examples, the second inverse transform 314 has a second size (e.g., N) that corresponds to a number of OFDM symbols associated with the codepoint 332. In some example, the base station 105 determines the second index value based on the second plurality of values using on one or more techniques described with reference to the first index value. For example, the second index value may be determined based on the index of the value having the greatest magnitude among the second plurality of values (e.g., using the "maximum" value selection technique) or based on an average value of the second plurality of values (e.g., using the average-based technique).

One or more transform operations can be implemented using an inverse fast Fourier transform (IFFT) operation and in multiple dimensions. For example, the first inverse transform 312 may include a first IFFT operation associated with a first dimension and performed by the 2D IDFT receiver 310, and the second inverse transform 314 may include a second IFFT operation associated with a second dimension and performed by the 2D IDFT receiver 310.

The 2D IDFT receiver 310 may identify from the codebook 330, based on the first index value and the second index value, a particular codepoint corresponding to the non-coherent transmission. For example, the 2D IDFT receiver 310 may identify the codepoint 332 based on m and n, such as by using m and n as lookup indices to the codebook 330. The base station 105 may determine, based on the codepoint 332, control information associated with the UE 115. For example, the base station 105 may use the codebook 330 to determine bits of the control information 302 based on the codepoint 332.

Although the 2D IDFT receiver 310 and the 2D transmitter 370 are described separately for convenience, in some implementations, functions of a transmitter and a receiver can be implemented using a transceiver. For example, one or both of the base station 105 and the UE 115 may include a transceiver that performs operations described with reference to both the 2D IDFT receiver 310 and the 2D transmitter 370. Further, in some implementations, operations described with reference to the 2D transmitter 370 may be performed by an encoder that is separate from a transmitter of the UE 115. In some examples, operations described with reference to the 2D IDFT receiver 310 may be performed by a decoder that is separate from a receiver of the base station 105.

One or more aspects described with reference to FIG. 3A may reduce power consumption, processing cycles, or latency in a wireless communication system. For example, operations of the 2D IDFT receiver 310 may be of a lower complexity than other operations performed by other devices, such as correlation-based operations. To illustrate, a decode operation based on a conventional technique may have a complexity of M*N(log 2(M)+log 2(N)) operations (where log 2 indicates a base-two logarithm). A decode operation based on a reduced-complexity receiver implementation may have complexity M*N*log 2(M)+log 2(N), saving (M−1)*N*log 2(N) operations relative to the conventional technique. In some conventional devices, a correlator may have a complexity of approximately (M*N)^3 operations. Thus, in some aspects of disclosure, the 2D IDFT receiver 310 may save approximately (M*N)^3−(M*N log 2(M)+N log 2(N)) operations in receiving and decoding the codepoint 332. As a result, power consumption, processing cycles, and communication latency may be reduced.

Figure 3B:
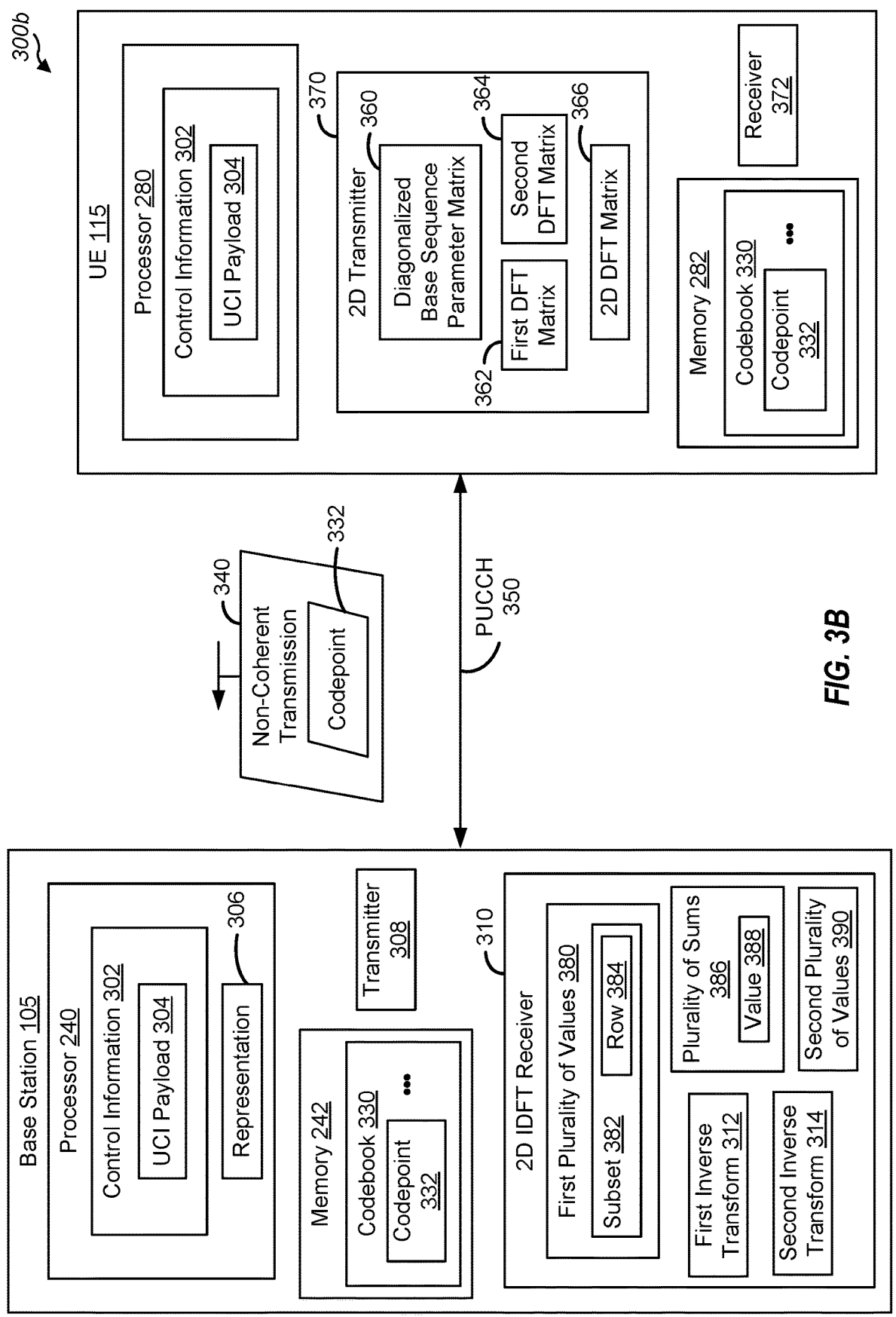
FIG. 3B is a block diagram illustrating another example of a wireless communication system to perform two-dimensional operations for a non-coherent transmission according to some aspects of the disclosure.

FIG. 3B is a block diagram illustrating another example of a wireless communication system 300b. In some examples, one or more features of the wireless communication system 300b of FIG. 3B are as described with reference to the wireless communication system 300a of FIG. 3A. For example, the wireless communication system 300b may include one or more UEs, such as the UE 115, and may include one or more base stations, such as the base station 105. The UE 115 may include the 2D transmitter 370, and the base station 105 may include the 2D IDFT receiver 310.

During operation, the UE 115 may generate the non-coherent transmission 340 using one or more techniques described with reference to FIG. 3A. The UE 115 may send the non-coherent transmission 340 to the base station 105 via the PUCCH 350. The base station 105 may be configured to receive the non-coherent transmission 340 including the representation 306 of the codepoint 332 from the UE 115. In some circumstances, the representation 306 of the codepoint 332 may differ from the codepoint 332 due to noise, interference, or one or more other conditions.

The base station 105 may perform one or more operations to decode the representation 306 of the codepoint 332 (e.g., by correcting one or more errors of the representation 306 so that the corrected representation 306 matches the codepoint 332). For example, the 2D IDFT receiver 310 may perform, based on the non-coherent transmission 340, the first inverse transform 312 associated with a plurality of OFDM symbols of the non-coherent transmission 340 to generate a first plurality of values 380. For example, performing the first inverse transform 312 may include transforming the plurality of OFDM symbols of the non-coherent transmission 340 in a first dimension. In some examples, the plurality of OFDM symbols includes a first number (e.g., N) of OFDM symbols, and the first inverse transform 312 has a size corresponding to a second number (e.g., M), such as where the first inverse transform 312 corresponds to an M-point IDFT or IFFT operation. In some examples, the first number corresponds to N and the second number corresponds to M, as described with reference to the examples of FIG. 3A. In some examples, the first plurality of values 380 includes or corresponds to a first matrix having the first number of columns and the second number of rows. In some examples, prior to performing the first inverse transform 312, the 2D IDFT receiver 310 multiples a received signal (e.g., Y, or the representation 306) by the diagonalized base sequence parameter matrix 360 (or by another matrix, such as S*) to generate a result (e.g., S*Y) and performs the first inverse transform 312 based on the result.

To further illustrate, Table 1 illustrates an example of the result, and Table 2 illustrates an example of an output of the first inverse transform 312. In the examples of Tables 1 and 2, M=N=3. In other examples, one or both of M and N may correspond to different values.

TABLE 1

| 0.1302 + 0.2594i | 0.1595 − 0.2425i | −0.2398 − 0.0169i |
| 0.1302 + 0.2594i | 0.1595 − 0.2425i | −0.2398 − 0.0169i |
| 0.1302 + 0.2594i | 0.1595 − 0.2425i | −0.2398 − 0.0169i |

TABLE 2

| 0.2256 + 0.4493i | 0.2763 − 0.4200i | −0.5019 − 0.0293i |
| 0.0000 + 0.0000i | 0.0000 + 0.0000i | 0.0000 + 0.0000i |
| 0.0000 + 0.0000i | 0.0000 + 0.0000i | 0.0000 + 0.0000i |

In the example of FIG. 3B, the 2D IDFT receiver 310 may determine a plurality of sums 386 associated with the first plurality of values 380. For example, the 2D IDFT receiver 310 may determine the plurality of sums 386 by summing absolute values of elements of each row of the first plurality of values 380. To illustrate, the 2D IDFT receiver 310 may sum absolute values of a 1st row of the first plurality of values 380 to generate a 1st value of the plurality of sums 386, may sum absolute values of a 2nd row of the first plurality of values 380 to generate a 2nd value of the plurality of sums 386, and may sum absolute values of an Mth row of the first plurality of values 380 to generate an Mth value of the plurality of sums 386.

The 2D IDFT receiver 310 may identify a first index value (e.g., m) based on the plurality of sums 386. For example, the 2D IDFT receiver 310 may determine the first index value based on the first index value being associated with the greatest sum (e.g., a value 388) of the plurality of sums 386. To illustrate, if the 1st value of the plurality of sums 386 is greater than the other values of the plurality of sums 386, and if an index of the 1$^{st}$ value corresponds to one, then the first index value may correspond to one (e.g., m=1). As another example, if the 2nd value of the plurality of sums 386 is greater than the other values of the plurality of sums 386, and if an index of the 2nd value corresponds to two, then the first index value may correspond to two (e.g., m=2). As an additional example, if the Mth value of the plurality of sums 386 is greater than the other values of the plurality of sums 386, and if an index of the Mth value corresponds to M, then the first index value may correspond to M (e.g., m=M).

To further illustrate, Table 3 illustrates examples of magnitudes of the output of the first inverse transform 312, and Table 4 illustrates examples of the plurality of sums 386:

TABLE 3

| 0.5028 | 0.5028 | 0.5028 |
| 0 | 0 | 0 |
| 0 | 0 | 0 |

TABLE 4

| 1.5083 |
| 0 |
| 0 |

The 2D IDFT receiver 310 may identify a particular row 384 (e.g., f_m) of the first plurality of values 380 based on the first index value. For example, if m=1, then f_m=f_1 (and the particular row 384 corresponds to the 1st row of the first plurality of values 380). As additional examples, if m=2, then f_m=f_2 (and the particular row 384 corresponds to the 2nd row of the first plurality of values 380), and if m=M, then f_m=f_M (and the particular row 384 corresponds to the Mth row of the first plurality of values 380).

To further illustrate, continuing with the example of Tables 1-4, the particular row 384 may correspond to: 0.2256+0.4493i 0.2763−0.4200i −0.5019−0.0293i In some aspects of the disclosure, the 2D IDFT receiver 310 may perform the second inverse transform 314 based on the particular row 384. For example, the 2D IDFT receiver 310 may perform the second inverse transform 314 based on the particular row 384 to generate a second plurality of values 390. For example, performing the second inverse transform 314 may include transforming the particular row 384 in a second dimension different from the first dimension. In some examples, the particular row 384 includes the first number (e.g., N) of values, and the second inverse transform 314 has a size corresponding to the first number (e.g., N), such as where the second inverse transform 314 corresponds to an N-point IDFT or IFFT operation.

To further illustrate, continuing with the example of Tables 1-4, an output of the second inverse transform 314 may correspond to:

−0.0000+0.0000i 0.3907+0.7782i 0.0000+0.0000i

The 2D IDFT receiver 310 may determine a second index value (e.g., n) based on the second plurality of values 390. For example, the 2D IDFT receiver 310 may determine the second index value based on the second index value being associated with a greatest absolute value of absolute values of the second plurality of values 390. To illustrate, if a 1st value of the second plurality of values 390 is greater than the other values of the second plurality of values 390, and if an index of the $1^{st}$ value corresponds to one, then the second index value may correspond to one (e.g., n=1). As another example, if a 2nd value of the second plurality of values 390 is greater than the other values of the second plurality of values 390, and if an index of the 2nd value corresponds to two, then the second index value may correspond to two (e.g., n=2). As an additional example, if an Nth value of the second plurality of values 390 is greater than the other values of the second plurality of values 390, and if an index of the Nth value corresponds to N, then the second index value may correspond to N (e.g., n=N).

The 2D IDFT receiver 310 may identify from the codebook 330, based on the first index value and the second index value, a particular codepoint corresponding to the non-coherent transmission. For example, the 2D IDFT receiver 310 may identify the codepoint 332 based on m and n, such as by using m and n as lookup indices to the codebook 330. The base station 105 may determine, based on the codepoint 332, control information associated with the UE 115. For example, the base station 105 may use the codebook 330 to determine bits of the control information 302 based on the codepoint 332.

To further illustrate certain aspects of the disclosure, depending on the particular example, the 2D IDFT receiver 310 may select a particular number of values 388 from the plurality of values 390 and may determine the first index value (e.g., m) based on the particular number of values 388. The particular number may correspond to L, where L indicates a positive integer. In a first example, the 2D IDFT receiver 310 selects one value 388 from the plurality of sums 386 and determines the first index value (e.g., m) based on the value 388. In this example, L=1. In other examples, L may be greater than one.

To illustrate, in a second example, the 2D IDFT receiver 310 may select multiple values 388 from the plurality of sums 386 (e.g., where L>1) and may select multiple rows 384 based on the multiple values 388. In a first implementation of the second example, selecting the particular number of values 388 includes identifying the L greatest non-zero values of the plurality of sums 386. To illustrate, if L=2, then the 2D IDFT receiver 310 may select the two greatest values from the plurality of sums 386. As another example, if L=4, then the 2D IDFT receiver 310 may select the four greatest values from the plurality of sums 386.

In a second implementation of the second example, selecting the particular number of values 388 includes identifying a particular value of the plurality of sums 386 having a greatest magnitude among the plurality of sums 386 and further includes identifying L−1 non-zero values neighboring the particular value. For example, the particular value may be associated with a particular index within the plurality of sums 386, and the neighbor values of the particular value may be associated with indices within the plurality of sums 386 that are within a threshold range of the particular index of the particular value. To further illustrate, the second implementation of the second example may be performed according to Equation 6:

$$\{m_1^*, m_2^*, \ldots, m_L^*\} = \qquad \text{(Equation 6)}$$
$$\left\{m^* - \frac{L-1}{2}, \ldots, m^* - 1, m^*, m^* + 1, \ldots, m^* + \frac{L-1}{2}\right\}.$$

In Equation 6, each m* may correspond to a respective value of the multiple values 388.

In accordance with implementations of the second example, after determining the particular number of values 388, the 2D IDFT receiver 310 may select the multiple rows 384 of the first plurality of values 380 based on the particular number of values 388. For example, for each value of the multiple values 388, the 2D IDFT receiver 310 may select a row 384 of the first plurality of values 380 having an index (e.g., row number) corresponding to an index of the value of the multiple values 388. A number of the multiple rows 384 may correspond to L, and selecting the multiple rows 384 may result in a subset 382 of the first plurality of values 380. In an example, the subset 382 corresponds to a sub-matrix of the first plurality of values 380 that includes L rows and N columns.

In accordance with implementations of the second example, the 2D IDFT receiver 310 may perform the second inverse transform 314 based on the subset 382 to generate the second plurality of values 390, such as by performing an N-point IDFT or IFFT operation based on the subset 382 to generate the second plurality of values 390. In implementations of the second example, the 2D IDFT receiver 310 may identify the particular codepoint 332 based on the second plurality of values 390. For example, the 2D IDFT receiver 310 may identify a value of the second plurality of values 390 having a greatest magnitude among the second plurality of values 390 and may identify index values (e.g., a row index and a column index) associated with the value within the first plurality of values 380 (or the subset 382). The index values may correspond to m and n, and the 2D IDFT receiver 310 may identify the codepoint 332 based on m and n, such as by using m and n as lookup indices to the codebook 330.

In some aspects, the particular value L may be determined based on one or more of an decoding accuracy parameter or a decoding complexity parameter. To illustrate, a greater value of L may correspond to increased decoding accuracy (e.g., by increasing a number of values 388 used to determine the second plurality of values 390). In this case, the particular value L may be increased to increase the decoding accuracy parameter. In some other examples, a lower particular value L may decrease decoding complexity, such as by decoding a number of values 388 used to determine the second plurality of values 390. In this case, the particular value L may be decreased to reduce the decoding complexity parameter. In some examples, the particular value L is selected from a range of values bounded by 1 and M. Thus, in some examples, a range of values available for L may correspond to 1, 2, . . . , M.

One or more aspects described with reference to FIG. 3B may reduce power consumption, processing cycles, or communication latency or a receiver. To illustrate, in the example of FIG. 3B, decoding of the representation 306 to determine the codepoint 332 may have a complexity of $N*(M*\log 2(M)+\log 2(N))$ operations (e.g., in connection with the first example) or $N*(M*\log 2(M)+L*\log 2(N))$ operations (e.g., in connection with the second example). In some cases, a number of operations may be reduced by $(M-1)*N*\log 2(N)$ operations or by $(M-L)*N*\log 2(N)$ operations, respectively, as compared to certain other receiver designs, such as a correlator-based receiver. As a result, power consumption, processing cycles, and communication latency may be reduced.

FIG. 6 is a flow chart of an example of a method 600 of wireless communication that may be performed by a UE according to some aspects of the disclosure. In some examples, the method 600 is performed by the UE 115.

The method 600 includes receiving, by a UE, control information associated with a non-coherent transmission to a base station, at 602. For example, the UE 115 may receive the control information 302 for the non-coherent transmission 340 to the base station 105. The receiver 372 may be configured to receive the control information 302.

The method further includes performing the non-coherent transmission, where performing the non-coherent transmission includes transmitting the codepoint to the base station, at 604. The codepoint is determined based on a diagonalized base sequence parameter matrix, a first DFT matrix of a first size, and a second DFT matrix of a second size. For example, the UE 115 may perform the non-coherent transmission 340 including transmitting the codepoint 332 to the base station 105. The codepoint 332 may be based on the diagonalized base sequence parameter matrix 360, the first DFT matrix 362 of the first size, and the second DFT matrix 364 of the second size. The 2D transmitter 370 may be configured to perform the non-coherent transmission 340.

FIG. 7A is a flow chart of an example of a method 700 of wireless communication that may be performed by a base station according to some aspects of the disclosure. In some examples, the method 700 is performed by the base station 105.

The method 700 includes performing, by a base station based on a non-coherent transmission received from a UE, a first inverse transform operation to determine a plurality of OFDM symbols, at 702. Each OFDM symbol of the plurality of OFDM symbols is associated with a set of values. To illustrate, the base station 105 may receive the non-coherent transmission 340 from the UE 115 as the representation 306 and may perform the first inverse transform 312 based on the representation 306 to determine the plurality of OFDM symbols each including the set of values. The 2D IDFT receiver 310 may be configured to receive the non-coherent transmission 340 from the UE 115 as the representation 306.

The method 700 further includes determining a first plurality of values by selecting, for each OFDM symbol, a particular value from among the set of values associated with the OFDM symbol, at 704. For example, the base station 105 may select (e.g., using the processor 240), from the set of values for each OFDM symbol, the maximum value of the set of values.

The method 700 further includes, after determining the first plurality of values, determining a first index value (e.g., m) based on the first plurality of values, at 706. In some examples based on a "maximum" value selection technique, the base station 105 may select the maximum value from the first plurality of values as the first index value. In some other examples based on an average-based technique, the base station 105 may select the first index value based on an average value of the first plurality of values. The processor 240 may determine the first index value.

The method 700 further includes performing a second inverse transform operation based on the first plurality of values to determine a second plurality of values, at 708. For example, the base station 105 may perform (e.g., using the processor 240) the second inverse transform based on the first plurality of values to determine the second plurality of values.

The method 700 further includes determining a second index value (e.g., n) based on the second plurality of values, at 710. For example, to determine the second index value, the base station 105 may perform one or more operations described with reference to the first index value, such as by selecting the second index value based on a "maximum" value of the second plurality of values or based on an average value of the second plurality of values. The processor 240 may determine the second index value.

The method 700 further includes identifying from a codebook, based on the first index value and the second index value, a particular codepoint corresponding to the non-coherent transmission, at 712. For example, the base station 105 may use the first index value and the second index value (e.g., m, n) to identify the codepoint 332 in the codebook 330. The codebook 330 may specify that the codepoint 332 is associated with the control information 302. The processor 240 may identify the particular codepoint.

Figures 7B, 7C:
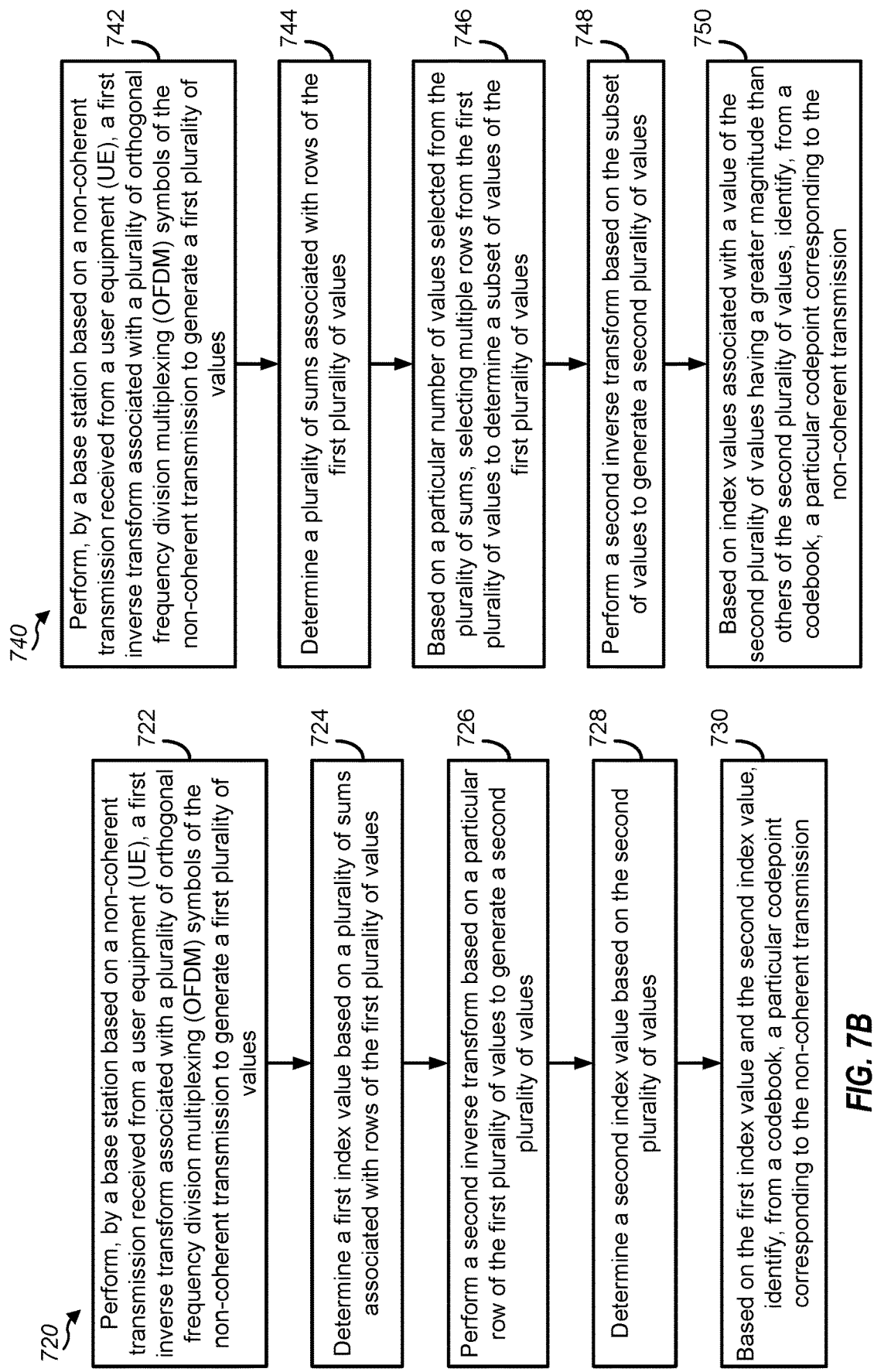
FIG. 7B is a flow chart of another example of a method of wireless communication that may be performed by a base station according to some aspects of the disclosure.
FIG. 7C is a flow chart of an additional example of a method of wireless communication that may be performed by a base station according to some aspects of the disclosure.

FIG. 7B is a flow chart of another example of a method 720 of wireless communication that may be performed by a base station according to some aspects of the disclosure. In some examples, the method 720 is performed by the base station 105.

The method 720 includes performing, by a base station based on a non-coherent transmission received from a UE, a first inverse transform associated with a plurality of OFDM symbols of the non-coherent transmission to generate a first plurality of values, at 722. To illustrate, the base station 105 may receive (e.g., using the 2D IDFT receiver 310) the non-coherent transmission 340 from the UE 115 as the representation 306 and may perform (e.g., using the processor 240) the first inverse transform 312 based on the representation 306 to determine the plurality of OFDM symbols each including the set of values.

The method 720 further includes determining a first index value based on a plurality of sums associated with rows of the first plurality of values, at 724. For example, the first index value may correspond to the index value of a value of the plurality of sums 386 having a greater magnitude than other values of the plurality of sums 386. The first index value may correspond to the index value m described with reference to FIG. 3B. The processor 240 may determine the first index value.

The method 720 further includes performing a second inverse transform based on a particular row of the first plurality of values to generate a second plurality of values, at 726. For example, the base station 105 may determine (e.g., using the processor 240) the particular row 384 based on the first index value and may perform (e.g., using the processor 240) the second inverse transform 314 based on the particular row 384 to generate the second plurality of values 390.

The method 720 further includes determining a second index value based on the second plurality of values, at 728. For example, the second index value may correspond to the index value of a value of second plurality of values 390 having a greater magnitude than other values of the second plurality of values 390. The second index value may correspond to the index value n described with reference to FIG. 3B. The processor 240 may determine the second index value.

The method 720 further includes, based on the first index value and the second index value, identifying, from a codebook, a particular codepoint corresponding to the non-coherent transmission, at 730. For example, the base station 105 may use the first index value and the second index value (e.g., m, n) to identify the codepoint 332 in the codebook 330. The codebook 330 may specify that the codepoint 332 is associated with the control information 302. The processor 240 may identify the particular codepoint.

FIG. 7C is a flow chart of another example of a method 740 of wireless communication that may be performed by a base station according to some aspects of the disclosure. In some examples, the method 740 is performed by the base station 105.

The method 740 includes performing, by a base station based on a non-coherent transmission received from a UE, a first inverse transform associated with a plurality of OFDM symbols of the non-coherent transmission to generate a first plurality of values, at 742. To illustrate, the base station 105 may receive (e.g., using the 2D IDFT receiver 310) the non-coherent transmission 340 from the UE 115 as the representation 306 and may perform (e.g., using the processor 240) the first inverse transform 312 based on the representation 306 to determine the plurality of OFDM symbols.

The method 740 further includes determining a plurality of sums associated with rows of the first plurality of values, at 744. For example, the base station 105 may sum values of each row of the first plurality of values 380 to determine the plurality of sums 386 (e.g., using the processor 240).

The method 740 further includes, based on a particular number of values selected from the plurality of sums, selecting multiple rows from the first plurality of values to determine a subset of values of the first plurality of values, at 746. For example, the base station 105 may determine (e.g., using the processor 240) the subset 382 by selecting multiple rows 384 of the first plurality of values 380 having indices corresponding to indices of multiple values 388 of the plurality of sums 386.

The method 740 further includes performing a second inverse transform based on the subset of values to generate a second plurality of values, at 748. For example, the base station 105 may perform (e.g., using the processor 240) the second inverse transform 314 based on the subset 382 to determine the second plurality of values.

The method 740 further includes, based on index values associated with a value of the second plurality of values having a greater magnitude than others of the second plurality of values, identifying, from a codebook, a particular codepoint corresponding to the non-coherent transmission, at 750. For example, the base station 105 may identify (e.g., using the processor 240) a value of the second plurality of values 390 having a greater magnitude than other values of the second plurality of values 390. The base station 105 may identify (e.g., using the processor 240) indices associated with the value (e.g., m, n) and may use the indices to identify the codepoint 332 in the codebook 330. The codebook 330 may specify that the codepoint 332 is associated with the control information 302.

Figure 8:
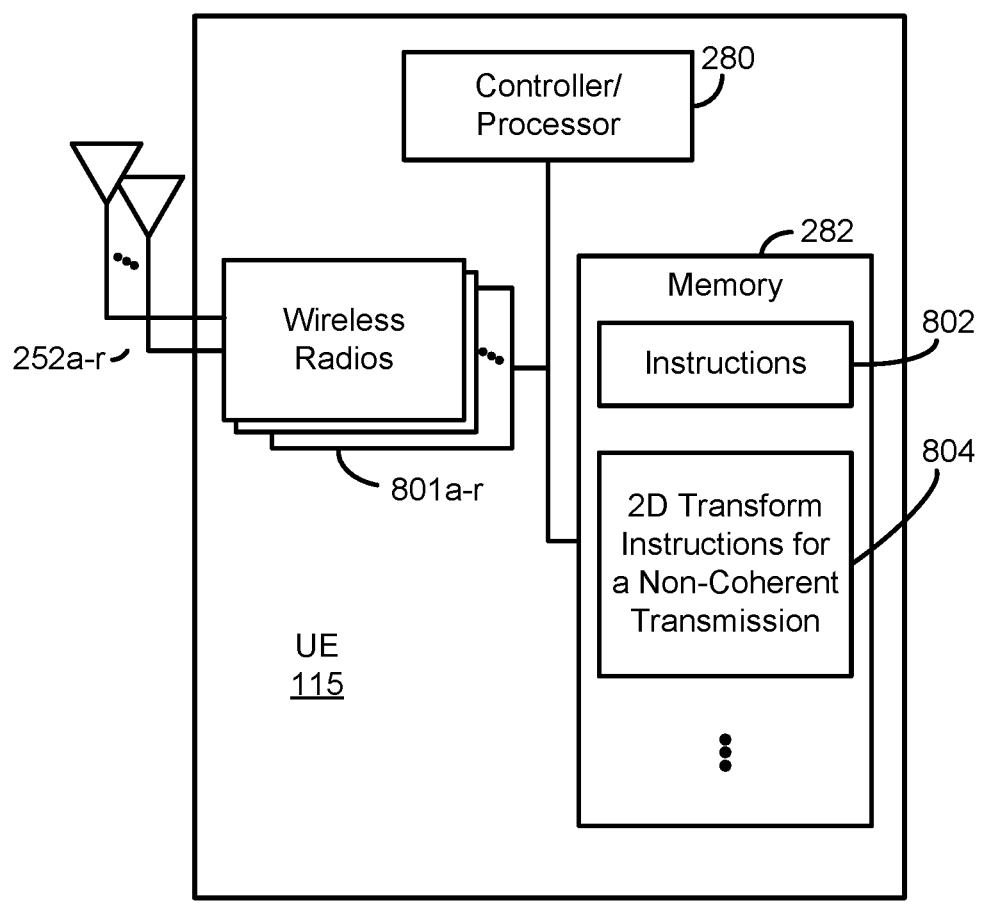
FIG. 8 is a block diagram illustrating an example of a UE to perform two-dimensional operations for a non-coherent transmission according to some aspects of the disclosure.

FIG. 8 is a block diagram illustrating an example of a UE 115 to perform two-dimensional operations for a non-coherent transmission according to some aspects of the disclosure. The UE 115 may include the processor 280 and the memory 282. The processor 280 may execute instructions 802 stored in the memory 282 to initiate, perform, or control one or more operations described herein. The processor 280 may execute the instructions 802 to transmit and receive signals via wireless radios 801a-r and the antennas 252a-r. The wireless radios 801a-r may include hardware or other components corresponding to one or more features described with reference to FIG. 2, such as the modulator/demodulators 254a-r, the MIMO detector 256, the receive processor 258, the transmit processor 264, the TX MIMO processor 266, the 2D transmitter 370, the receiver 372, one or more other components, or a combination thereof. In some examples, the processor 280 executes 2D transform instructions 804 to determine the codepoint 332 for the non-coherent transmission 340 based on one or more of the first DFT matrix 362, the second DFT matrix 364, or the 2D DFT matrix 366.

Figure 9:
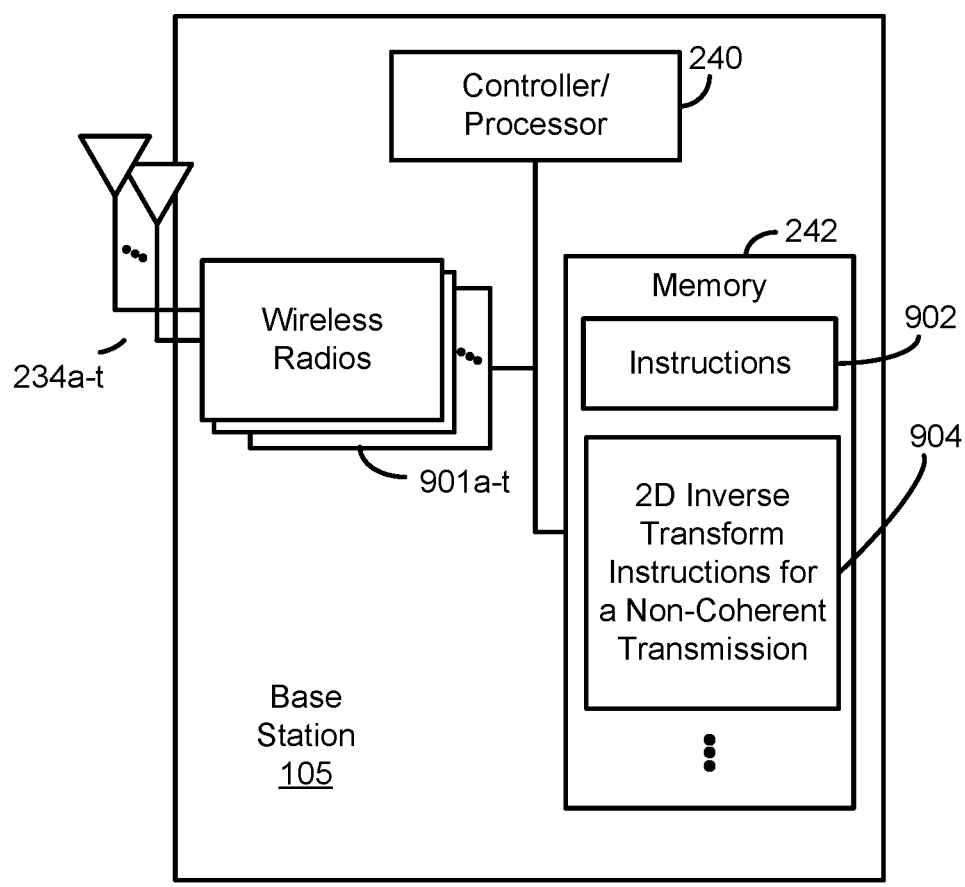
FIG. 9 is a block diagram illustrating an example of a base station to perform two-dimensional operations for a non-coherent transmission according to some aspects of the disclosure.

FIG. 9 is a block diagram illustrating an example of a base station 105 to perform two-dimensional operations for a non-coherent transmission according to some aspects of the disclosure. The base station 105 may include the processor 240 and the memory 242. The processor 240 may execute instructions 902 stored in the memory 242 to initiate, perform, or control one or more operations described herein. The processor 240 may execute the instructions 902 to transmit and receive signals via wireless radios 901a-t and the antennas 234a-t. The wireless radios 901a-t may include hardware or other components corresponding to one or more features described with reference to FIG. 2, such as the modulator/demodulators 232a-t, the MIMO detector 236, the receive processor 238, the transmit processor 220, the TX MIMO processor 230, the transmitter 308, the 2D IDFT receiver 310, one or more other components, or a combination thereof. In some examples, the processor 240 executes 2D inverse transform instructions 904 to decode the representation 306 using one or more of the first inverse transform 312 or the second inverse transform 314.

In a first aspect, a method of wireless communication includes performing, by a base station based on a non-coherent transmission received from a UE, a first inverse transform associated with a plurality of OFDM symbols of the non-coherent transmission to generate a first plurality of values. The method further includes determining a first index value based on a plurality of sums associated with rows of the first plurality of values. The method further includes performing a second inverse transform based on a particular row of the first plurality of values to generate a second plurality of values and determining a second index value based on the second plurality of values. The method further includes, based on the first index value and the second index value, identifying, from a codebook, a particular codepoint corresponding to the non-coherent transmission.

In a second aspect, alone or in combination with the first aspect, the plurality of OFDM symbols includes a first number of OFDM symbols, the first inverse transform has a size corresponding to a second number, and the first plurality of values corresponds to a first matrix having a number of columns corresponding to the first number and a number of rows corresponding to the second number.

In a third aspect, alone or in combination with one or more of the first through second aspects, the method further includes determining the plurality of sums by summing absolute values of elements of each of the rows of the first plurality of values.

In a fourth aspect, alone or in combination with one or more of the first through third aspects, the first index value is determined based on the first index value being associated with the greatest sum of the plurality of sums.

In a fifth aspect, alone or in combination with one or more of the first through fourth aspects, the particular row includes a first number of values, and the second inverse transform has a size corresponding to the first number.

In a sixth aspect, alone or in combination with one or more of the first through fifth aspects, the second index value is determined based on the second index value being associated with a greatest absolute value of absolute values of the second plurality of values.

In a seventh aspect, alone or in combination with one or more of the first through sixth aspects, an apparatus includes a memory and one or more processors coupled to the memory. The one or more processors are configured to perform, based on a non-coherent transmission received from a UE, a first inverse transform associated with a plurality of OFDM symbols of the non-coherent transmission to generate a first plurality of values. The one or more processors are further configured to determine a first index value based on a plurality of sums associated with rows of the first plurality of values and to perform a second inverse transform based on a particular row of the first plurality of values to generate a second plurality of values. The one or more processors are further configured to determine a second index value based on the second plurality of values and to identify, from a codebook based on the first index value and the second index value, a particular codepoint corresponding to the non-coherent transmission.

In an eighth aspect, an apparatus includes means for performing, based on a non-coherent transmission received from a UE, a first inverse transform associated with a plurality of OFDM symbols of the non-coherent transmission to generate a first plurality of values. The apparatus further includes means for determining a first index value based on a plurality of sums associated with rows of the first plurality of values. The apparatus further includes means for performing a second inverse transform based on a particular row of the first plurality of values to generate a second plurality of values and means for determining a second index value based on the second plurality of values. The apparatus further includes means for identifying, from a codebook based on the first index value and the second index value, a particular codepoint corresponding to the non-coherent transmission.

In a ninth aspect, a non-transitory computer-readable medium stores instructions executable by a processor to perform operations. The operations include performing, based on a non-coherent transmission received from a UE, a first inverse transform associated with a plurality of OFDM symbols of the non-coherent transmission to generate a first plurality of values. The operations further include determining a first index value based on a plurality of sums associated with rows of the first plurality of values and performing a second inverse transform based on a particular row of the first plurality of values to generate a second plurality of values. The operations further include determining a second index value based on the second plurality of values and identifying, from a codebook based on the first index value and the second index value, a particular codepoint corresponding to the non-coherent transmission.

In a tenth aspect, a method of wireless communication includes performing, by a base station based on a non-coherent transmission received from a UE, a first inverse transform associated with a plurality of OFDM symbols of the non-coherent transmission to generate a first plurality of values. The method further includes determining a plurality of sums associated with rows of the first plurality of values. The method further includes, based on a particular number of values selected from the plurality of sums, selecting multiple rows from the first plurality of values to determine a subset of values of the first plurality of values. The method further includes performing a second inverse transform based on the subset of values to generate a second plurality of values and identifying, from a codebook based on index values associated with a value of the second plurality of values having a greater magnitude than others of the second plurality of values, a particular codepoint corresponding to the non-coherent transmission.

In an eleventh aspect, alone or in combination with the tenth aspect, the particular number corresponds to a positive integer L, and selecting the particular number of values includes identifying L greatest non-zero values of the plurality of sums.

In a twelfth aspect, alone or in combination with one or more of the first through eleventh aspects, the particular number corresponds to a positive integer L, and selecting the particular number of values includes identifying a particular value of the plurality of sums having a greatest magnitude among the plurality of sums and identifying L−1 non-zero values neighboring the particular value.

In a thirteenth aspect, alone or in combination with one or more of the first through twelfth aspects, the method further includes determining the particular value based on one or more of an decoding accuracy parameter or a decoding complexity parameter.

In a fourteenth aspect, alone or in combination with one or more of the first through thirteenth aspects, the particular value is increased to increase the decoding accuracy parameter.

In a fifteenth aspect, alone or in combination with one or more of the first through fourteenth aspects, the particular value is decreased to reduce the decoding complexity parameter.

In a sixteenth aspect, alone or in combination with one or more of the first through fifteenth aspects, the particular value is selected from a range of values bounded by 1 and M, and M indicates a number of rows of a matrix corresponding to the first plurality of values.

In a seventeenth aspect, alone or in combination with one or more of the first through sixteenth aspects, the plurality of OFDM symbols includes a first number of OFDM symbols, the first inverse transform has a size corresponding to a second number, and the first plurality of values corresponds to a first matrix having the first number of columns and the second number of rows.

In an eighteenth aspect, an apparatus includes a memory and one or more processors coupled to the memory. The one or more processors are configured to perform, based on a non-coherent transmission received from a UE, a first inverse transform associated with a plurality of OFDM symbols of the non-coherent transmission to generate a first plurality of values. The one or more processors are further configured to determine a plurality of sums associated with rows of the first plurality of values and to select, based on a particular number of values selected from the plurality of sums, multiple rows from the first plurality of values to determine a subset of values of the first plurality of values. The one or more processors are further configured to perform a second inverse transform based on the subset of values to generate a second plurality of values and to identify, from a codebook based on index values associated with a value of the second plurality of values having a greater magnitude than others of the second plurality of values, a particular codepoint corresponding to the non-coherent transmission.

In a nineteenth aspect, an apparatus includes means for performing, based on a non-coherent transmission received from a UE, a first inverse transform associated with a plurality of OFDM symbols of the non-coherent transmission to generate a first plurality of values. The apparatus further includes means for determining a plurality of sums associated with rows of the first plurality of values and means for selecting, based on a particular number of values selected from the plurality of sums, multiple rows from the first plurality of values to determine a subset of values of the first plurality of values. The apparatus further includes means for performing a second inverse transform based on the subset of values to generate a second plurality of values and means for identifying, from a codebook based on index values associated with a value of the second plurality of values having a greater magnitude than others of the second plurality of values, a particular codepoint corresponding to the non-coherent transmission.

In a twentieth aspect, a non-transitory computer-readable medium stores instructions executable by a processor to perform operations. The operations include performing, based on a non-coherent transmission received from a UE, a first inverse transform associated with a plurality of OFDM symbols of the non-coherent transmission to generate a first plurality of values. The operations further include determining a plurality of sums associated with rows of the first plurality of values and, based on a particular number of values selected from the plurality of sums, selecting multiple rows from the first plurality of values to determine a subset of values of the first plurality of values. The operations further include performing a second inverse transform based on the subset of values to generate a second plurality of values and, based on index values associated with a value of the second plurality of values having a greater magnitude than others of the second plurality of values, identifying, from a codebook, a particular codepoint corresponding to the non-coherent transmission.

In a twenty-first aspect alternatively or in addition to one or more of the first through twentieth aspects, an apparatus for wireless communication includes a receiver configured to receive control information associated with a non-coherent transmission to a base station. The apparatus further includes a transmitter configured to perform the non-coherent transmission based on the control information. The non-coherent transmission includes transmission of a codepoint to the base station, and the codepoint is determined based a diagonalized base sequence parameter matrix, a first discrete Fourier transform (DFT) matrix of a first size, and a second DFT matrix of a second size.

In a twenty-second aspect alternatively or in addition to one or more of the first through twenty-first aspects, the first size corresponds to a number of frequency tones associated with the codepoint.

In a twenty-third aspect alternatively or in addition to one or more of the first through twenty-second aspects, the second size corresponds to a number of orthogonal frequency division multiplexing (OFDM) symbols associated with the codepoint.

In a twenty-fourth aspect alternatively or in addition to one or more of the first through twenty-third aspects, the codepoint is based on a Kronecker product of the first DFT matrix and the second DFT matrix.

In a twenty-fifth aspect alternatively or in addition to one or more of the first through twenty-fourth aspects, the codepoint corresponds to a product of the diagonalized base sequence parameter matrix and the Kronecker product of the first DFT matrix and the second DFT matrix.

In a twenty-sixth aspect alternatively or in addition to one or more of the first through twenty-fifth aspects, the transmitter is further configured to perform the non-coherent transmission without transmitting a demodulation reference signal (DMRS) to the base station.

In a twenty-seventh aspect alternatively or in addition to one or more of the first through twenty-sixth aspects, the apparatus includes a memory configured to store a two-dimensional (2D) DFT matrix that is based on the first DFT matrix and the second DFT matrix.

In a twenty-eighth aspect alternatively or in addition to one or more of the first through twenty-seventh aspects, the 2D DFT matrix has a number of rows corresponding to a product of the first size and the second size.

In a twenty-ninth aspect alternatively or in addition to one or more of the first through twenty-eighth aspects, the 2D DFT matrix has a number of columns corresponding to a product of the first size and the second size.

In a thirtieth aspect alternatively or in addition to one or more of the first through twenty-ninth aspects, the apparatus includes a processor configured to select a subset of the 2D DFT matrix and to multiply the diagonalized base sequence parameter matrix with the subset to determine the codepoint.

In a thirty-first aspect alternatively or in addition to one or more of the first through thirtieth aspects, the subset corresponds to a particular row of the 2D DFT matrix, and wherein the subset is selected based on a number of frequency tones associated with the codepoint.

In a thirty-second aspect alternatively or in addition to one or more of the first through thirty-first aspects, a method of wireless communication, includes receiving, by a user equipment (UE), control information associated with a non-coherent transmission to a base station. The method further includes performing the non-coherent transmission based on the control information. Performing the non-coherent transmission includes transmitting a codepoint to the base station, and the codepoint is determined based a diagonalized base sequence parameter matrix, a first DFT matrix of a first size, and a second DFT matrix of a second size.

In a thirty-third aspect alternatively or in addition to one or more of the first through thirty-second aspects, the first size corresponds to a number of frequency tones associated with the codepoint.

In a thirty-fourth aspect alternatively or in addition to one or more of the first through thirty-third aspects, the second size corresponds to a number of orthogonal frequency division multiplexing (OFDM) symbols associated with the codepoint.

In a thirty-fifth aspect alternatively or in addition to one or more of the first through thirty-fourth aspects, the codepoint is based on a Kronecker product of the first DFT matrix and the second DFT matrix.

In a thirty-sixth aspect alternatively or in addition to one or more of the first through thirty-fifth aspects, the codepoint corresponds to a product of the diagonalized base sequence parameter matrix and the Kronecker product of the first DFT matrix and the second DFT matrix.

In a thirty-seventh aspect alternatively or in addition to one or more of the first through thirty-sixth aspects, the UE performs the non-coherent transmission without transmitting a demodulation reference signal (DMRS) to the base station.

In a thirty-eighth aspect alternatively or in addition to one or more of the first through thirty-seventh aspects, the UE stores a two-dimensional (2D) DFT matrix that is based on the first DFT matrix and the second DFT matrix.

In a thirty-ninth aspect alternatively or in addition to one or more of the first through thirty-eighth aspects, the 2D DFT matrix has a number of rows corresponding to a product of the first size and the second size.

In a fortieth aspect alternatively or in addition to one or more of the first through thirty-ninth aspects, the 2D DFT matrix has a number of columns corresponding to a product of the first size and the second size.

In a forty-first aspect alternatively or in addition to one or more of the first through fortieth aspects, the method includes selecting a subset of the 2D DFT matrix and multiplying the diagonalized base sequence parameter matrix with the subset to determine the codepoint.

In a forty-second aspect alternatively or in addition to one or more of the first through forty-first aspects, the subset corresponds to a particular row of the 2D DFT matrix, and the subset is selected based on a number of frequency tones associated with the codepoint.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof. In addition, one or more features described herein may be implemented via specialized processor circuitry, via executable instructions, or a combination thereof.

Those of skill would further appreciate that the various illustrative logical blocks, modules, circuits, and operations (e.g., the operations in FIGS. 6 and 7A-7C) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, the apparatus comprising:
a receiver configured to receive control information associated with a non-coherent transmission to a base station; and
a transmitter configured to perform the non-coherent transmission based on the control information, wherein the non-coherent transmission includes transmission of a codepoint to the base station, and wherein the codepoint is determined based a diagonalized base sequence parameter matrix, a first discrete Fourier transform (DFT) matrix of a first size, and a second DFT matrix of a second size.

2. The apparatus of claim 1, wherein the first size corresponds to a number of frequency tones associated with the codepoint.

3. The apparatus of claim 1, wherein the second size corresponds to a number of orthogonal frequency division multiplexing (OFDM) symbols associated with the codepoint.

4. The apparatus of claim 1, wherein the codepoint is based on a Kronecker product of the first DFT matrix and the second DFT matrix.

5. The apparatus of claim 4, wherein the codepoint corresponds to a product of the diagonalized base sequence parameter matrix and the Kronecker product of the first DFT matrix and the second DFT matrix.

6. The apparatus of claim 1, wherein the transmitter is further configured to perform the non-coherent transmission without transmitting a demodulation reference signal (DMRS) to the base station.

7. The apparatus of claim 1, further comprising a memory configured to store a two-dimensional (2D) DFT matrix that is based on the first DFT matrix and the second DFT matrix.

8. The apparatus of claim 7, wherein the 2D DFT matrix has a number of rows corresponding to a product of the first size and the second size.

9. The apparatus of claim 7, wherein the 2D DFT matrix has a number of columns corresponding to a product of the first size and the second size.

10. The apparatus of claim 7, further comprising a processor configured to select a subset of the 2D DFT matrix and to multiply the diagonalized base sequence parameter matrix with the subset to determine the codepoint.

11. The apparatus of claim 10, wherein the subset corresponds to a particular row of the 2D DFT matrix, and wherein the subset is selected based on a number of frequency tones associated with the codepoint.

12. A method of wireless communication, comprising:
receiving, by a user equipment (UE), control information associated with a non-coherent transmission to a base station; and
performing the non-coherent transmission based on the control information, wherein performing the non-coherent transmission includes transmitting a codepoint to the base station, and wherein the codepoint is determined based a diagonalized base sequence parameter matrix, a first discrete Fourier transform (DFT) matrix of a first size, and a second DFT matrix of a second size.

13. The method of claim 12, wherein the first size corresponds to a number of frequency tones associated with the codepoint.

14. The method of claim 12, wherein the second size corresponds to a number of orthogonal frequency division multiplexing (OFDM) symbols associated with the codepoint.

15. The method of claim 12, wherein the codepoint is based on a Kronecker product of the first DFT matrix and the second DFT matrix.

16. The method of claim 15, wherein the codepoint corresponds to a product of the diagonalized base sequence parameter matrix and the Kronecker product of the first DFT matrix and the second DFT matrix.

17. The method of claim 12, wherein the UE performs the non-coherent transmission without transmitting a demodulation reference signal (DMRS) to the base station.

18. The method of claim 12, wherein the UE stores a two-dimensional (2D) DFT matrix that is based on the first DFT matrix and the second DFT matrix.

19. The method of claim 18, wherein the 2D DFT matrix has a number of rows corresponding to a product of the first size and the second size.

20. The method of claim 18, wherein the 2D DFT matrix has a number of columns corresponding to a product of the first size and the second size.

21. The method of claim 18, further including:
selecting a subset of the 2D DFT matrix; and
multiplying the diagonalized base sequence parameter matrix with the subset to determine the codepoint.

22. The method of claim 21, wherein the subset corresponds to a particular row of the 2D DFT matrix, and wherein the subset is selected based on a number of frequency tones associated with the codepoint.

23. A method of wireless communication, comprising:
performing, by a base station based on a non-coherent transmission received from a user equipment (UE), a first inverse transform associated with a plurality of orthogonal frequency division multiplexing (OFDM) symbols of the non-coherent transmission to generate a first plurality of values;
determining a first index value based on a plurality of sums associated with rows of the first plurality of values;
performing a second inverse transform based on a particular row of the first plurality of values to generate a second plurality of values;
determining a second index value based on the second plurality of values; and
based on the first index value and the second index value, identifying, from a codebook, a particular codepoint corresponding to the non-coherent transmission.

24. The method of claim 23, wherein the plurality of OFDM symbols includes a first number of OFDM symbols, wherein the first inverse transform has a size corresponding to a second number of tones of the plurality of OFDM symbols, and wherein the first plurality of values corresponds to a first matrix having a number of columns corresponding to the first number and a number of rows corresponding to the second number.

25. The method of claim 23, further comprising determining the plurality of sums by summing absolute values of elements of each of the rows of the first plurality of values.

26. The method of claim 23, wherein the first index value is determined based on the first index value being associated with a greatest sum of the plurality of sums.

27. The method of claim 23, wherein the particular row includes a first number of values, and wherein the second inverse transform has a size corresponding to the first number.

28. The method of claim 23, wherein the second index value is determined based on the second index value being associated with a greatest absolute value of absolute values of the second plurality of values.

29. An apparatus comprising:
a memory; and
one or more processors coupled to the memory and configured to:
perform, based on a non-coherent transmission received from a user equipment (UE), a first inverse transform associated with a plurality of orthogonal frequency division multiplexing (OFDM) symbols of the non-coherent transmission to generate a first plurality of values;
determine a plurality of sums associated with rows of the first plurality of values;
based on a particular number of values selected from the plurality of sums, select multiple rows from the first plurality of values to determine a subset of values of the first plurality of values;
perform a second inverse transform based on the subset of values to generate a second plurality of values; and
based on index values associated with a value of the second plurality of values having a greater magnitude than others of the second plurality of values, identify, from a codebook, a particular codepoint corresponding to the non-coherent transmission.

30. The apparatus of claim 29, wherein the particular number corresponds to a positive integer L, and wherein the one or more processors are further configured to select the particular number of values by identifying L greatest non-zero values of the plurality of sums.

\* \* \* \* \*